US005219946A

United States Patent [19]

Tanikawa et al.

[11] Patent Number: 5,219,946

[45] Date of Patent: Jun. 15, 1993

[54] BINDER RESIN AND PROCESS FOR PRODUCING IT

[76] Inventors: Hirohide Tanikawa; Masaki Uchiyama; Tsutomu Kukimoto; Yasutaka Akashi; Masaaki Taya; Makoto Unno; Seiichi Takagi, all c/o Canon Kabushiki Kaisha 30-2, 3-chome, Shimomaruko, Ohta-ku, Tokyo, Japan

[21] Appl. No.: 611,705

[22] Filed: Nov. 8, 1990

[51] Int. Cl.$^5$ .............................................. C08F 252/02

[52] U.S. Cl. .................................... 525/301; 524/112; 524/751; 524/754

[58] Field of Search ................ 525/301; 524/751, 754, 524/112

[56] References Cited

U.S. PATENT DOCUMENTS

| | | | |
|---|---|---|---|
| 2,221,776 | 11/1940 | Carlson | 95/5 |
| 2,297,691 | 10/1942 | Carlson | 95/5 |
| 2,618,552 | 11/1952 | Wise | 95/1.9 |
| 2,874,063 | 2/1959 | Greig | 117/17.5 |
| 3,666,363 | 5/1971 | Tanaka et al. | 355/10 |
| 3,909,258 | 9/1975 | Kotz | 96/1 |
| 4,071,361 | 1/1978 | Marushima | 96/1.4 |
| 5,066,727 | 11/1991 | Aizawa et al. | 525/296 |

FOREIGN PATENT DOCUMENTS

| | | |
|---|---|---|
| 0259819 | 3/1988 | European Pat. Off. . |
| 55-134861 | 10/1980 | Japan . |
| 56-16144 | 2/1981 | Japan . |
| 56-158340 | 12/1981 | Japan . |
| 58-86558 | 5/1983 | Japan . |
| 59-139053 | 8/1984 | Japan . |
| 60-166958 | 8/1985 | Japan . |
| 61-123856 | 6/1986 | Japan . |
| 61-123857 | 6/1986 | Japan . |
| 62-280758 | 12/1987 | Japan . |
| 63-223014 | 9/1988 | Japan . |

OTHER PUBLICATIONS

Database WPIL, No. 88-108147 & JP-A-62 280758.

Patent Abstracts of Japan, vol. 9, No. 207, Aug. 24, 1985, & JP-A-60 69659.

Patent Abstracts of Japan, vol. 10, No. 312, Oct. 23, 1986, & JP-A-61 123855.

*Primary Examiner*—Maurice J. Welsh
*Assistant Examiner*—Rachel Johnson

[57] ABSTRACT

A binder resin comprises a vinyl copolymer, a mixture of vinyl copolymers, or a mixture of a vinyl copolymer and a vinyl polymer. A resin component with a molecular weight of not more than 10,000 is contained in an amount of from 5 to 50% by weight based on the whole resin. The vinyl copolymer or the mixture of vinyl copolymers has an acid anhydride group and a carboxyl group.

43 Claims, 5 Drawing Sheets

BINDER RESIN AND PROCESS FOR PRODUCING IT

BACKGROUND OF THE INVENTION

1. Field of the Invention

The present invention relates to a binder for a toner which is used in a dry developer used for an image forming process such as electrophotography, electrostatic recording or magnetic recording.

2. Related Background Art

Methods have been conventionally known as electrophotography, as disclosed in U.S. Pat. No. 2,297,691, Japanese Patent Publications No. 42-23910 and No. 43-24748 and so forth. In general, copies are obtained by forming an electrostatic latent image on a photosensitive member, utilizing a photoconductive material and according to various means, subsequently developing the latent image by the use of a toner, and transferring the toner image to a transfer medium such as paper if necessary, followed by fixing by the action of heat, pressure, heat-and-pressure, or solvent vapor. In the case when the process comprises a toner-image transfer step, the process is usually provided with the step of removing the toner remaining on a photosensitive member.

As developing processes in which an electrostatic latent image is formed into a visible image by the use of a toner, known methods include the magnetic brush development as disclosed in U.S. Pat. No. 2,874,063, the cascade development as disclosed in U.S. Pat. No. 2,618,552, the powder cloud development as disclosed in U.S. Pat. No. 2,221,776, and the method in which a conductive magnetic toner is used, as disclosed in U.S. Pat. No. 3,909,258.

As toners used in these development processes, fine powder obtained by dispersing a dye and/or pigment in a natural or synthetic resin has been hitherto used. For example, colored resin particles formed by finely grinding a binder resin such as polystyrene comprising a colorant dispersed therein, to have a size of about 1 to 30 μ are used as the toner. A toner incorporated with magnetic material particles such as magnetite or ferrite is also used as the magnetic toner. In a system in which a two-component type developer is used, the toner is usually used by mixture with carrier particles such as glass beads, ion powder and ferrite particles.

Nowadays, such recording processes have been widely utilized not only in commonly available copying machines, but also in output means of computers or facsimile machines or for the printing of microfilms. Accordingly, a higher performance has become required, and the above recording processes have now been required to simultaneously achieve the improvements in performance such that an apparatus is made small-sized, lightweight, low-energy, high-speed, maintenance-free, and personal. In order to meet these requirements, the needs on toners have become severer in various aspects. For example, when the copying machines or printers are made small-sized, heat sources such as heat-fixing assemblies and exposure lamps are squeezed into a narrow space, so that the temperature inside the machine tends to become higher. Hence, toners must be made to have an improved blocking resistance. In order to make the copying machines or printers lightweight, a fixing roller is so designed as to be more thin-walled and slender, and a cleaning mechanism for a heat-fixing roller or a cleaning mechanism for a photosensitive member tends to be more simple and lightweight. Thus, there is a tendency that the machine is provided with no applicator used for applying an anti-offset oil to a fixing unit. This makes it necessary to improve fixing properties of toners, offset resistance thereof, and cleaning resistance of photosensitive members. In order to make the copying machines, etc. more small-energy or to make development more high-speed, the fixing properties of toners must be improved as a matter of course. In order to make the copying machines or printers more personal, the reliability must be improved, and it becomes important to cause no paper jam. The paper jam may commonly often occur when a transfer sheet (copy paper) winds around a roller, and thus it becomes necessary for toners to have the properties of suppressing the winding of paper around a fixing roller. However, as shown in FIG. 1, the performances required when a toner is prepared and the properties of a toner itself often conflict with each other.

The needs on toners are severe as will be seen from the above instances, and it is difficult to meet the requirements unless these performance and properties are simultaneously improved. However, it would be nonsense if the achievement of these improvements results in lowering of development performance such as image quality and durability of toners, and production efficiency of toners.

These greatly depend on the performance of the binder resin used in toners. It has been proposed to improve the characteristics of a toner by the use of a release agent, a plasticizer or other additives. Use of these, however, is a supplementary means.

Various methods have been proposed for the improvement of binder resins used in toners.

For example, Japanese Patent Application Laid-open No. 56-158340 proposes a toner containing a binder resin comprised of a low-molecular weight polymer and a high-molecular weight polymer. In reality, it is difficult for this binder resin to be incorporated with a cross-linking component. Hence, in order to improve the offset resistance of toners, it is necessary to make the molecular weight of the high-molecular weight polymer larger or to increase the proportion of the high-molecular weight polymer. This tends to cause extreme lowering of the grindability of a toner.

In relation to a toner containing a binder resin comprised of a blend of a low-molecular weight polymer with a cross-linked polymer, Japanese Patent Application Laid-open No. 58-86558 also proposes a toner comprising a low-molecular weight polymer and an insoluble infusible high-molecular weight polymer as main resin components. According to this technique, the fixing properties and grindability are presumed to be improved. However, it is difficult to satisfy in a high performance both the offset resistance and the grindability at the time of the manufacture of toners, because the weight average molecular weight/number average molecular weight (Mw/Mn) of the low-molecular weight polymer is as small as not more than 3.5 and the content of the insoluble infusible high-molecular weight polymer is as large as from 40 to 90 wt. %. Thus, it is very difficult from a practical viewpoint to give a toner well satisfying the fixing performance and the offset resistance unless a fixing machine is provided with an apparatus for feeding an anti-offset fluid. Moreover, the toner must be heat-kneaded at a temperature far higher than that in usual instances or heat-kneaded at a high shear, because the insoluble infusible high-molecular weight polymer used in a larger amount tends to have a very high melt viscosity as a result of the heat-kneading carried out when the toner is prepared. As a result, in the instance where it is kneaded at a high temperature, the toner characteristics tend to be lowered because of thermal decomposition of other additives. In the instance where it is kneaded at a high shear, the molecules of the binder resin may be excessively cut. Thus, there is the problem that the desired offset resistance can be achieved with difficulty.

Japanese Patent Application Laid-open No. 60-166958 proposes a toner comprising a resin composition obtained by polymerizing monomers in the presence of a low-molecular weight poly($\alpha$-methylstyrene) having a number average molecular weight of from 500 to 1,500.

In particular, this publication discloses that the number average molecular weight (Mn) may preferably range from 9,000 to 30,000. With an increase in Mn for the purpose of improving offset resistance of a toner, the fixing properties of the toner and the grindability at the time the toner is prepared may become more questionable from a practical viewpoint. Hence it is difficult to satisfy in a high performance the offset resistance and the grindability. Thus, the toner having a poor grindability at the time the toner is prepared brings about lowering of production efficiency, and also coarse toner particles tend to be included into the toner, undesirably resulting in black spots around a toner image.

Japanese Patent Application Laid-open No. 56-16144 proposes a toner containing a binder resin component having at least one maximum value in each region of a molecular weight of from $10^3$ to $8\times10^4$ and a molecular weight of from $10^5$ to $2\times10^6$, in the molecular weight distribution measured by gel permeation chromatography (GPC). This toner can give a superiority in the grindability, offset resistance, fixing properties, anti-filming or anti-fusing to a photosensitive member, image quality, etc. The toner, however, is sought to be further improved in the offset resistance and fixing properties. In particular, it is sought to more improve the fixing properties while maintaining or improving other various performances, to cope with the recent severe demands.

Japanese Patent Application Laid-open No. 63-223014 proposes a binder resin that can solve such a problem. At present, however, it is required to achieve a much higher durability and reliability.

Binder resins greatly influence the developability of toners, and it has been sought to provide such a binder resin that makes stable the quantity of triboelectricity of a toner.

In addition, even if a toner has an excellent offset resistance, it may occur that a fixing roller is contaminated as the toner is used, bringing about a deterioration of offset resistance.

In a heat-pressure fixing method, Japanese Patent Application Laid-open No. 55-134861 proposes to use a binder resin containing an acid component for the purpose of improving fixing performance.

The toner making use of such a binder resin, however, tends to cause a charge insufficiency under conditions of a high humidity and a charge excess under conditions of a low humidity and also tends to be affected by environmental variations, so that fog may be caused and image density may be lowered to make it impossible to obtain a sufficient developability.

On the other hand, an acid anhydride has the action of improving chargeability. Japanese Patent Applications Laid-open No. 59-139053 and No. 62-280758 propose toners employing a resin containing such an acid anhydride. These employ a method in which a polymer having a large number of acid anhydride groups is diluted in a binder resin. In these methods, the resin containing acid anhydride groups must be uniformly dispersed in a binder resin. Unless it is dispersed in a good state, toner particles may be non-uniformly charged, so that fog tends to be caused and the developing performance of a toner may be adversely affected. In these methods, the negative chargeability is so strong that the methods are not preferable for positively chargeable toners.

Japanese Patent Applications Laid-open No. 61-123856 and No. 61-123857 propose toners in which acid anhydride groups are dispersed and diluted by their copolymerization to polymer chains in a binder resin so that the problem of dispersion can be eliminated and a uniform chargeability can be obtained.

Such toners, however, may bring about a charge excess, often causing fog or a lowering of density, when applied in a high-speed copying machine or high-speed printer under conditions of a low humidity. This is due to the fact that the acid anhydride groups in the binder resin used in these toners, though uniformly dispersed, are large in their quantities.

SUMMARY OF THE INVENTION

An object of the present invention is to provide a binder resin that has solved the above problems, and a process for producing such a binder resin.

Another object of the present invention is to provide a binder resin that can give a toner having superior fixing properties and at the same time superior offset resistance, wind-around resistance and blocking resistance and causing no contamination of a fixing roller, and a process for producing such a binder resin.

Still another object of the present invention is to provide a binder resin that has a good grindability and can facilitate a good production efficiency of a toner, and a process for producing such a binder resin.

A further object of the present invention is to provide a binder resin which is superior in anti-fusion to the inside of a grinding apparatus when toner materials are pulverized, or anti-fusion to a photosensitive member, and a process for producing such a binder resin.

A still further object of the present invention is to provide a binder resin that can produce a toner having superior developing performance (in particular, image quality), durability and environmental stability, and a process for producing such a binder resin.

According to the present invention, there is provided a binder resin comprising a vinyl copolymer, a mixture of vinyl copolymers, or a mixture of a vinyl copolymer and a vinyl polymer, wherein a resin component with a molecular weight of not more than 10,000 is contained in an amount of from 5 to 50% by weight based on the whole resin, and said vinyl copolymer has an acid anhydride group and a carboxyl group.

According to another aspect of the present invention, there is provided a process for producing a binder resin, comprising the steps of;

forming by solution polymerization a vinyl polymer or vinyl copolymer having a glass transition point (Tg) of $\geqq 50°$ C.;

forming by heat treatment acid anhydride groups in said polymer or copolymer; and carrying out suspension polymerization by dissolving said polymer or copolymer in a polymerizable monomer or a mixture of polymerizable monomers to hydrolyze part of said acid anhydride groups, thereby obtaining a resin containing a component with a molecular weight of not more than 10,000 in an amount of from 5 to 50% by weight based on the whole resin and having an acid anhydride group and a carboxyl group.

DESCRIPTION OF THE PREFERRED EMBODIMENTS

Figure 1:
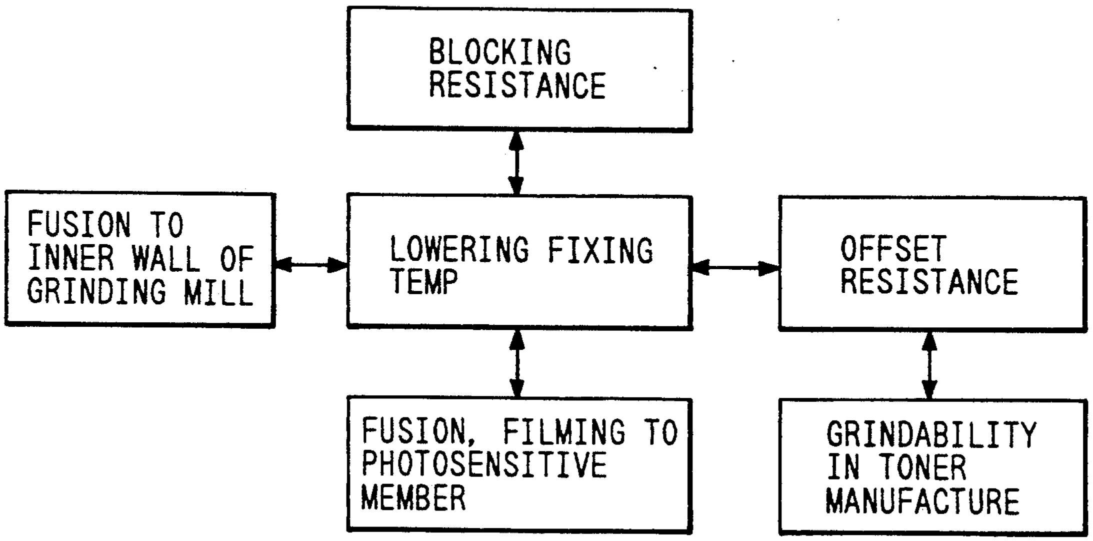
FIG. 1 is a diagram to show the correlation between the characteristics required for a toner.
Figure 2:
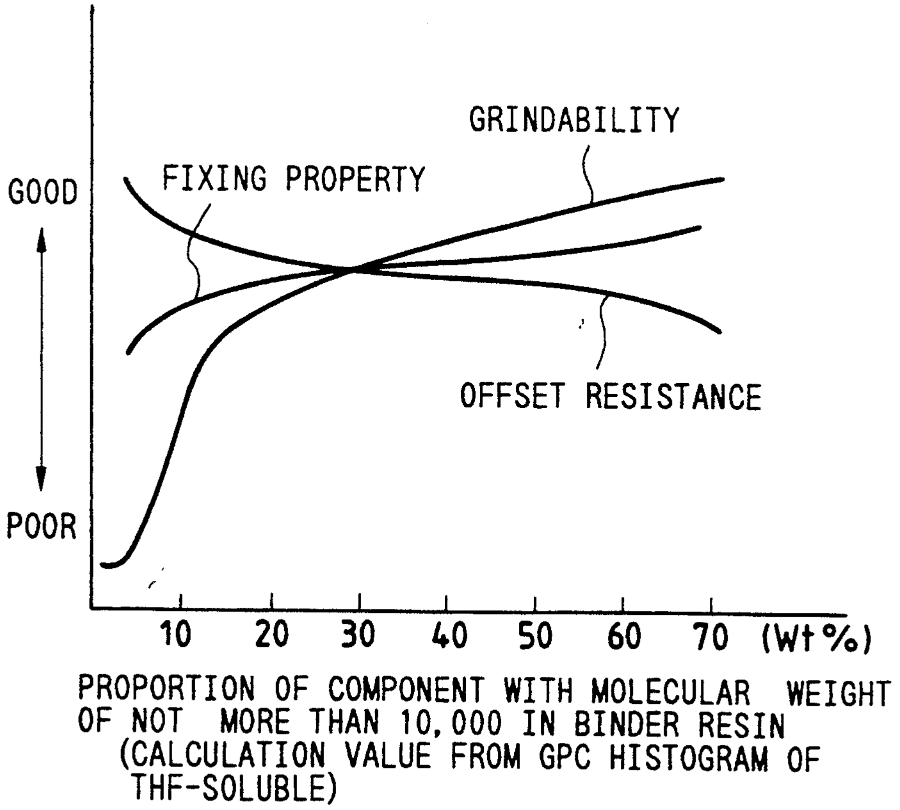
FIG. 2 is a graph to show the correlation between content of resin component with a molecular weight of not more than 10,000 and toner characteristics.

For the purpose of simultaneously achieving the objects as stated above, the present inventors made intensive studies from various angles, using various binder resins, in respect of their constitution and performance. As a result, they have discovered that the above objects can be achieved when a binder resin has specific functional groups and has a specific constitution for the molecular weight distribution of a THF-soluble matter. When a binder resin is dissolved using a solvent such as THF (tetrahydrofuran), it can be separated into an insoluble matter and a soluble matter. The molecular weight distribution of the soluble matter can be measured by GPC. They made studies on the molecular weight distribution of the THF-soluble matter of the binder resin containing an acid component unit, the properties of whether or not a toner is capable of being fixed at a high temperature or a low temperature (hereinafter simply "fixing properties"), the offset resistance of toners, the grindability of toner materials and the blocking resistance of toners. As a result, they have found that, as shown in FIG. 2, a component with a molecular weight of not more than about 10,000 in the molecular weight distribution of the THF-soluble matter in GPC acts differently from a component with that of more than about 10,000. It was revealed that the proportion of the component having a molecular weight of not more than 10,000 to the whole binder resin is more concerned with the grindability than with the fixing properties or offset resistance. It was also revealed from other studies that the THF-insoluble matter affects mainly the offset resistance and the transfer sheet wind-around resistance to a fixing roller. The component with a molecular weight of not more than 10,000 in the THF-soluble matter affects mainly the grindability at the time a toner is prepared, the fusing of a toner material to the inner wall of a grinding machine, the blocking resistance of a toner, the resistance to fusing and filming of a toner to a photosensitive member.

It was further revealed that a component with a molecular weight of more than 10,000 in the THF-soluble matter mainly influences the fixing properties of a toner. The component with a molecular weight of not more than 10,000 may be preferably in an amount of from 5 to 50% by weight, and more preferably from 10 to 40% by weight.

In order to effectively achieve the above performances, the THF-soluble matter may preferably have a peak (preferably a main peak) in the region of a molecular weight of from 2,000 to 100,000.

In order to attain superior performances, the THF-soluble matter preferably has a peak in the region of a molecular weight of less than 15,000 and not less than 2,000, and preferably from 3,000 to 12,000, and also preferably have a peak or shoulder in the region of a molecular weight of from 15,000 to 100,000, and more preferably from 20,000 to 80,000. If it has no peak at a molecular weight of from 2,000 to less than 15,000 and has a peak at a molecular weight of less than 2,000, or the component with a molecular weight of not more than 10,000 is contained in an amount of more than 50% by weight, problems may occur in respect to the blocking resistance, the fusing and filming of a toner to a photosensitive member, and the fusing of a toner material to the inner wall of a grinding machine. If it has no peak at a molecular weight of less than 15,000 and has a peak at a molecular weight of not less than 15,000, or the component with a molecular weight of not more than 10,000 is contained in an amount of less than 5% by weight, the grindability may become problematic, and coarse particles may also be produced to give a problem. It is preferred that the gap between the peak in the region of a molecular weight of from 2,000 to less than 15,000 and the peak or shoulder in the region of a molecular weight of from 15,000 to 100,000 has a difference of a molecular weight of no less than 5,000, and preferably not less than 10,000.

When it has no peak or shoulder in the region of a molecular weight of more than 15,000 and has a peak only in the region of a molecular weight of less than 15,000, problems may occur in the offset resistance of a toner, the fusing and filming of a toner to a photosensitive member and the fusing of a toner material to the inner wall of a grinding machine. If it has no peak or shoulder in the region of a molecular weight of from 15,000 to 100,000 and has a main peak at a molecular weight of more than 100,000, a problem may occur in the grindability.

The THF-soluble matter may preferably be $Mw/Mn \geqq 5$. An Mw/Mn of less than 5 highly tends to result in lowering of offset resistance. It may preferably have an Mw/Mn of not more than 80, and more preferably $10 \leqq Mw/Mn \leqq 60$. In particular, the Mw/Mn of $10 \leqq Mw/Mn \leqq 60$ can bring about particularly superior performance in respect of various characteristics such as the grindability, the fixing properties, the offset resistance and the image quality.

The THF-insoluble matter in the resin composition may preferably be contained in an amount of from 5 to 70% by weight, and more preferably from 10 to 60% by weight. An amount less than 5% by weight, of the THF-insoluble matter tends to result in lowering of the offset resistance and the transfer sheet wind-around resistance to a fixing roller. An amount more than 70% by weight tends to cause a problem of the deterioration due to the cut of molecular chains as a result of heat-kneading at the time a toner is prepared. The THF-insoluble matter may preferably be contained in an amount of from 10 to 60% by weight, and more preferably from 15 to 50% by weight.

When the glass transition point $Tg_1$ of the resin component with a molecular weight of not more than 10,000 in the molecular weight distribution of the THF-soluble matter is compared with the glass transition point $Tg_r$ of the whole resin, the satisfaction of a relation of $Tg_1 \leqq Tg_r - 5$ can bring about a more improvement in the fixing properties, the grindability, the anti-fusing and anti-filming of a toner material to a photosensitive member, the anti-fusing of a toner to the inner wall of a grinding machine, and the blocking resistance.

The $Tg_1$ herein referred to is a value measured by the following method: At a temperature of 25° C., THF is flowed at a flow rate of 7 ml per minute. About 3 ml of a THF sample solution of about 3 mg/ml in concentration of the THF-soluble matter in a resin composition is injected into an apparatus for measuring molecular weight distribution, and the component with a molecular weight of not more than 10,000 is fractionated. After it has been fractionated, the solvent is evaporated under reduced pressure, followed by drying for 24 hours under reduced pressure in an atmosphere of 90° C. The above procedure is repeated until the component with a molecular weight of not more than 10,000 is obtained in an amount of about 20 mg. Thereafter, the glass transition point is measured by differential scanning colorimetry. The resulting value is expressed as $Tg_1$. The glass transition point (Tg) is measured according to the method prescribed in ASTM D3418-82, using a differential scanning calorimeter DSC-7 (available from Perkin Elmer Inc.)

As columns for fractionation, TSKgel G2000H, TSKgel G2500H, TSKgel G3000H, TSKgel G4000H (all available from Toyo Soda Manufacturing Co., Ltd.), etc. may be used.

In the present invention, TSKgel G2000H and TSKgel G3000H are used in combination.

As to the $Tg_r$, the glass transition point of the resin, the value is determined by differential scanning calorimetry.

Figure 3:
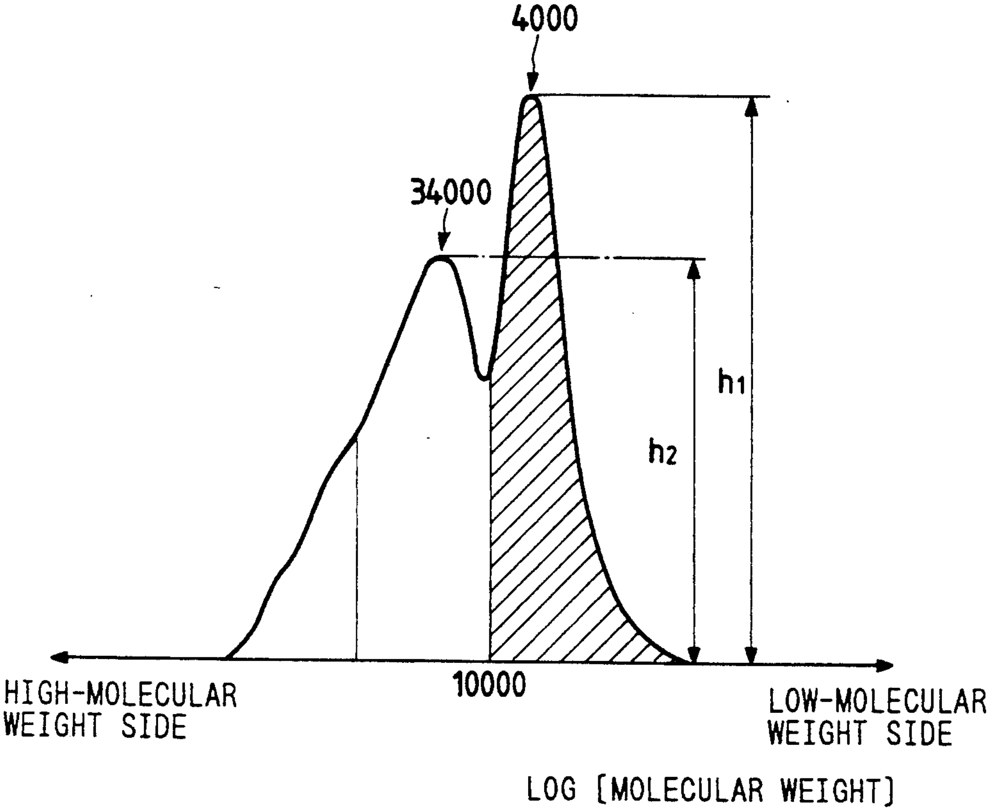
FIG. 3 shows a chart of GPC of a THF-soluble matter of a resin composition according to the present invention.

The most preferred embodiment of the present invention resides in a resin or resin composition having a ratio of $h_1/h_2$, of 0.4 to 4.0/1, where, as shown in FIG. 3, $h_2$ is the height of the highest peak in the region of a molecular weight of from 15,000 to 100,000 and $h_1$ is the height of the highest peak in the region of a molecular weight of from 2,000 to less than 15,000, in the molecular weight distribution measured by GPC of the THF-soluble matter. In addition, the THF-soluble matter may preferably have a number average molecular weight of $2,000 \leqq Mn \leqq 14,000$. A value of $Mn < 2,000$ brings about a problem in the offset resistance, and a value of $Mn < 14,000$ brings about a problem in the grindability and the fixing properties.

The THF-insoluble matter referred to in the present invention indicates the weight proportion of a polymer component or copolymer component having become insoluble to THF in the resin composition (i.e., substantially a cross-linked polymer or copolymer), and can be used as a parameter that indicates the degree of cross-linking of the resin composition containing a cross-linked component. The THF-insoluble matter is defined by a value measured in the following manner.

A sample (a 24 mesh-pass and 60 mesh-on powder) of the resin or resin composition is weighed in an amount of from 0.5 to 1.0 g ($W_1$ g), which is then put in a cylindrical filter paper (for example, No. 86R, available from Toyo Roshi K.K.) and set on a Soxhlet extractor. Extraction is carried out for 6 hours using from 100 to 200 ml of THF as a solvent, and the soluble component extracted by the use of the solvent is evaporated, followed by drying at 100° C. for several hours in vacuo or under reduced pressure. Then the THF-soluble resin component is weighed ($W_2$ g). The THF-insoluble matter of the resin or resin composition is determined from the following expression.

$$\text{THF-insoluble matter (\%)} = (W_1 - W_2)/W_1 \times 100$$

The product from which the solvent-soluble component has been evaporated to dryness, obtained through the above procedure, is dissolved in THF (tetrahydrofuran), which is passed through a sample treatment filter, and thereafter used as a sample for measuring the GPC of THF-soluble matter.

In the present invention, the molecular weight at the peak and/or shoulder on the chromatogram obtained by GPC (gel permeation chromatography) of the THF-soluble matter is/are measured under the following conditions.

Columns are stabilized in a heat chamber heated to 40° C. To the columns kept at this temperature, THF (tetrahydrofuran) as a solvent is flowed at a flow rate of 1 ml per minute, and from 50 to 200 μl of a THF sample solution of a resin prepared to have a sample concentration of from 0.05 to 0.6% by weight is injected thereinto to make measurement. In measuring the molecular weight of the sample, the molecular weight distribution ascribed to the sample is calculated from the relationship between the logarithmic value and count number of a calibration curve prepared using several kinds of monodisperse polystyrene standard samples. As the standard polystyrene samples used for the preparation of the calibration curve, it is preferred to use, for example, samples with molecular weights of $6 \times 10^2$, $2.1 \times 10^3$, $4 \times 10^3$, $1.75 \times 10^4$, $5.1 \times 10^4$, $1.1 \times 10^5$, $3.9 \times 10^5$, $8.6 \times 10^5$, $2 \times 10^6$ and $4.48 \times 10^6$, which are available from Pressure Chemical Co. or Toyo Soda Manufacturing Co., Ltd. It is suitable to use at least about 10 standard polystyrene samples. An RI (refractive index) detector is used as a detector.

Columns may preferably be used in combination of a plurality of commercially available polystyrene gel columns so that the regions of molecular weights of from $10^3$ to $2 \times 10^6$ can be accurately measured. For example, they may preferably comprise a combination of μ-Styragel 500, $10^3$, $10^4$ and $10^5$, available from Waters Co.; a combination of Shodex KF-80M, KF-801, 803, 804 and 805 or a combination of KA-802, 803, 804 and 805, available from Showa Denko K.K.; or a combination of TSKgel G1000H, G2000H, G2500H, G3000H, G4000H, G5000H, G6000H, G7000H and GMH, available from Toyo Soda Manufacturing Co., Ltd.

In regard to the % by weight with respect to the binder resin of the present invention, having a molecular weight of not more than 10,000, a chromatogram obtained by GPC is cut out at the part corresponding to the molecular weight of not more than 10,000, and the weight ratio thereof to a cutting corresponding to a molecular weight of more than 10,000 is calculated. Taking account of the % by weight of the above THF-insoluble matter, the % by weight with respect to the whole binder resin is calculated.

It is one of the characteristic features of the binder resin of the present invention that it contains a carboxyl group (a carboxylic acid unit) and an acid anhydride group. These functional groups contribute the improvements in developability, fixing properties, blocking resistance and offset resistance, the prevention of fusion and the prevention of contamination of a fixing roller. The carboxyl group and the acid anhydride group greatly influence the chargeability of toners. For example, in an instance in which a carboxyl group is present in a polymer chain, the binder resin has weak negative chargeability.

However, hydrophilicity increases with an increase in the proportion of the presence of carboxyl group, and the resin comes to release charges to the moisture in the air. This tendency becomes greater with an increase in the proportion of the presence of carboxyl group.

On the other hand, the acid anhydride group (an acid anhydride unit) has negative chargeability, but has no ability to release charges. The binder resin having these functional groups is negatively chargeable, and hence suitable for negatively chargeable toners. It, however, can also be used for positively chargeable toners depending on the selection of a charge control agent.

If a charge imparting ability of a positive chargeability control agent overcomes the negative-charge imparting ability of the functional groups of the binder resin, these functional groups come to adjust the release of positive charges.

Hence, the proportion of these functional groups is an important factor for making stable the negative chargeability or positive chargeability of toners, and thus the functional groups should preferably be in an appropriate ratio. The carboxyl group not only acts on the release of negative or positive charges but also acts on imparting of negative charges.

On the other hand, the acid anhydride group particularly effectively acts only on the impartment of charges. In the case when the carboxyl group is present in excess, charges are released in a large quantity, resulting in a shortage of the quantity of electricity in a toner to make it impossible to obtain a sufficient image density. This tendency becomes greater in an environment of a high humidity.

In the case when the acid anhydride group is present in excess, the quantity of electricity in a toner become excessive to bring about an increase in fog. This tendency becomes strong particularly in an environment of a low humidity, tending to cause lowering of image density.

The imparting of charges and the release of charges can be well balanced by controlling these functional groups to be present in an appropriate proportion, so that it becomes possible to stabilize the chargeability of toners and minimize the influence on chargeability by environmental variations. The presence of acid anhydride group improves the chargeability and at the same time the presence of carboxyl group enables release of charges to prevent a toner from being excessively charged.

To preferably achieve the above objects, the binder resin of the present invention may preferably satisfy the following condition.

The binder resin has a total acid value of from 2 to 100 mg KOH/g, more preferably from 5 to 70 mg KOH/g, and still more preferably from 5 to 50 mg KOH/g, as measured by hydrolysis of the acid anhydride group. A total acid value less than 2 mg KOH/g makes it difficult to obtain good fixing properties, and a total acid value more than 100 mg KOH/g makes it difficult to control the chargeability of toners.

It is also preferred that an acid value ascribable to the acid anhydride group is not more than 10 mg KOH/g, and more preferably not more than 8 mg KOH/g.

The acid value ascribable to the acid anhydride group may still more preferably from 0.1 to 6 mg KOH/g, and still more preferably from 0.5 to 5.5 mg KOH/g.

In an instance in which the acid value ascribable to the acid anhydride group is more than 10 mg KOH/g, the toner tends to be excessively charged to bring about lowering of density and generation of fog in an environment of a low humidity. It is also preferred that the acid value ascribable to the acid anhydride group is not more than 60%, preferably not more than 50%, more preferably not more than 40%, and still more preferably from 3 to 40%, of the total acid value of the whole binder resin. In an instance in which it is more than 60%, it becomes difficult to balance imparting and release of charges, and the ability to impart charges surpasses the ability to release charges, tending for the toner to be excessively charged.

The acid anhydride group may be present in such an extent that an absorption peak (approximately from 1,750 to 1850 $cm^{-1}$, in particular, in the vicinity of 1,780 $cm^{-1}$) assigned to the acid anhydride group can be seen in an infrared spectrum, so that a sufficient triboelectric stability of the toner can be obtained.

In the present invention, the peak in an infrared absorption spectrum refers to a peak that can be clearly recognized as a peak after making integration 16 times by FT-IR (Fourier transformation infrared absorption spectroscopy) with a resolution of 4 $cm^{-1}$. An apparatus for the FT-IR includes, for example, FT-IR1600 (manufactured by Perkin-Elmer Co.).

Thus, a uniform triboelectricity can be obtained even when a charge control agent is used in combination, and the triboelectric stability can be better than in the case when the toner is charge-controlled using a charge control agent alone. This brings about a stable density even after running for copying on a large number of sheets, and a decrease in fog. The binder resin having a carboxyl group has a strong affinity for paper because of its critical surface tension, and enables improvement of fixing properties. With respect to a fluorine resin or silicone rubber used in the surface layer of a heat-pressure means such as a heat-fixing roller, it has good release properties and hence is effective for offset resistance. Thus, it causes no, or only a little, contamination of a fixing roller. Moreover, the hydrogen bond between the carboxyl groups can effectively contribute the improvement in the blocking resistance of a toner and the prevention of fusion. In an instance in which dicarboxyl groups are present in the binder resin of the present invention, two carboxyl groups are present in proximity to each other. Hence, compared with the carboxyl group which is present alone, the affinity for paper acts more effectively and therefore the fixing properties can be improved. A low-molecular weight component of a polymer contributes to the improvement in fixing properties but, on the other hand, is one of the causes by which the blocking resistance is lowered. This is presumed to be mainly due to the action by heat of a low-molecular weight polymer chain. Here, the presence of dicarboxyl groups brings about stronger hydrogen bonds between the dicarboxyl groups than hydrogen bonds between carboxyl groups alone, making it possible to effectively suppress polymer chains from moving. Hence, polymer chains can be dissociated, with difficulty, from their entanglement at a temperature lower than the glass transition temperature of the resin, and the blocking or fusion can be made to occur with difficulty in the state the toner is normally used. However, at a high temperature exceeding the glass transition temperature, the hydrogen bond between dicarboxyl groups is cut off, and the polymer chains show sufficient activities at temperatures used in carrying out fixing, so that they tend to be deformed and also tend to be wettable to transfer mediums such as paper. In addition, after fixing, the dicarboxyl groups form stronger hydrogen bonds to cellulose components of the paper, and come to show good fixing properties. The above differences become clear when resins having the same glass transition temperatures are compared. In the case when the dicarboxyl groups are present, it is possible to achieve both the improvement in fixing properties and the blocking resistance or anti-fusion. This effect is remarkable particularly when the dicarboxyl groups are contained in the low-molecular weight component.

On the other hand, the effect on the blocking resistance or anti-fusion becomes more remarkable when a dicarboxyl group and a metal compound are reacted by heat to cross-link polymer chains, bringing about a greater effect than in the reaction between a carboxyl group present alone and a metal compound. This is presumably because the dicarboxyl group, which is capable of chelating to a metal element, can effectively facilitate cross-linking reaction because of the chelating effect and the energy of stabilizing crystalline fields to form a stable polymer complex, and hence a cross-linkage can effectively act. The mechanism by which the cross-linkage acts for the blocking resistance or anti-fusion is presumed to be the same as the above case of the hydrogen bonds between dicarboxyl groups. However, the fixing properties are not or only very slightly made poorer as polymer chains are cross-linked. Although the reason therefore is unclear, it is presumed that the polymer chains are stationary at a temperature lower than the glass transition temperature (about 50° to 60° C.) because of the cross-linking but, at a temperature higher than the glass transition temperature (about 60° to 70° C.), they are relatively freely movable like the case of the cross-linking between a carboxyl group present alone and a metal compound, thus having less influence on the fixing properties. Moreover, the metal cross-linking of the present invention can be greatly effective even when the reaction has partially occurred, and hence, the cross-linking is presumed to have no influence at all on the fixing properties.

Thus, the toner can be made to have a broad latitude in the fixing properties, blocking resistance and anti-fusion, and hence any toner performance to which a preference is desired to be given depending on the conditions under which toners are used (e.g. in high-speed machines or small-size machines) can be readily designed by controlling Tg of the binder resin to be used. For example, when a preference is given to fixing properties, the Tg may be set to a little lower degree, so that very good fixing properties can be attained and at the same time the necessary blocking resistance can also be attained. When conversely a preference is given to blocking resistance, the Tg may be set to a little higher degree, so that very superior blocking resistance can be attained and at the same time the necessary fixing properties can also be attained. It is also presumed that the carboxyl group, the dicarboxyl group and the acid anhydride group mutually act through metal ions of a metal salt or metal complex salt to form a variety of polymer complexes.

Hence, a cross-linkage attributable to these various polymer complexes each having different link strength and a firm cross-linkage by a polymerizable cross-linking agent can be formed in the binder resin of the present invention. The toner making use of the binder resin of the present invention can therefore be made to have an appropriate viscoelasticity, making it possible to improve offset resistance and also to effectively prevent the toner from being flowed out of a cleaning member for a fixing roller. Thus, as the most preferred embodiment of the binder resin of the present invention, the resin has the three types of functional groups, i.e., the carboxyl group, the dicarboxyl group and the acid anhydride group. Presence of all of these three enables effective exhibition of the above various effects and brings about performances most preferred as a toner.

As constituents of the binder resin according to the present invention, those commonly used as resins for toners can be used as long as they can form the molecular weight distribution previously described and have a carboxylic acid unit. Particularly preferred are a vinyl copolymer that utilizes vinyl monomers, a composition or mixture of vinyl copolymers, and a composition or mixture of a vinyl polymer and a vinyl copolymer.

The monomers that can be used to form the binder resin of the present invention are exemplified by the following.

They include, for example, unsaturated dibasic acids such as maleic acid, citraconic acid, itaconic acid, alkenylsuccinic acid, fumaric acid, and mesaconic acid; unsaturated dibasic acid anhydrides such as maleic anhydride, citraconic anhydride, itaconic anhydride, and alkenylsuccinic anhydride; half esters of unsaturated dibasic acids such as methyl maleate half ester, ethyl maleate half ester, butyl maleate half ester, methyl citraconate half ester, ethyl citraconate half ester, butyl citraconate half ester, methyl itaconate half ester, methyl alkenylsuccinate half ester, methyl fumarate half ester, and methyl mesaconate half ester; unsaturated dibasic acid esters such as dimethyl maleate, and dimethyl fumarate. They may further include $\alpha,\beta$-unsaturated acids such as acrylic acid, methacrylic acid, crotonic acid, and cinnamic acid; $\alpha,\beta$-unsaturated acid anhydrides such as crotonic anhydride, and cinnamic anhydride; anhydrides of such $\alpha,\beta$-unsaturated acids with lower fatty acids; alkenylmalonic acid, alkenylglutaric acid, alkenyladipic acid, anhydrides of these acids, and monoesters of these.

Among these, monoesters of $\alpha,\beta$-unsaturated dibasic acids having the structure as exemplified by maleic acid, fumaric acid and succinic acid are particularly preferably used as monomers for obtaining the binder resin of the present invention.

Comonomers of the vinyl polymers further include the following.

They include, for example, styrene and derivative thereof such as styrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; ethylenically unsaturated monoolefins such as ethylene, propylene, butylene, and isobutylene; unsaturated polyenes such as butadiene; halogenated vinyls such as vinyl chloride, vinylidene chloride, vinyl bromide, and vinyl fluoride; vinyl esters such as vinyl acetate, vinyl propionate, and vinyl benzoate; α-methylene aliphatic monocarboxylates such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate; acrylates such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, and phenyl acrylate; vinyl ethers such as methyl vinyl ether, ethyl vinyl ether, and isobutyl vinyl ether; vinyl ketones such as methyl vinyl ketone, hexyl vinyl ketone, and methyl isopropenyl ketone; N-vinyl compounds such as N-vinylpyrrole, N-vinylcarbazole, N-vinylindole, and N-vinylpyrrolidone; vinylnaphthalenes; acrylic acid or methacrylic acid derivatives such as acrylonitrile, methacrylonitrile, and acrylamide; and esters of the above α,β-unsaturated acids and diesters of the above dibasic acids. These vinyl monomers may be used alone or in combination of two or more kinds.

Of these, preferred is a combination of monomers that may give a styrene copolymer or a styrene-acrylate copolymer.

As a cross-linking monomer, a monomer having two or more of copolymerizable double bonds is used.

The binder resin of the present invention may, if necessary, be a polymer cross-linked with a cross-linkable monomer as exemplified below.

For example, aromatic divinyl compounds including, for example, divinylbenzene, and divinylnaphthalene; diacrylate compounds linked with an alkyl chain, including, for example, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, and those in which the acrylate in each of the above compounds has been replaced by methacrylate; diacrylate compounds bonded with an alkyl chain containing an ether bond, including, for example, diethylene glycol diacrylate, triethylene glycol diacrylate, tetraethylene glycol diacrylate, polyethylene glycol #400 diacrylate, polyethylene glycol #600 diacrylate, dipolyethylene glycol diacrylate, and those in which the acrylate in each of the above compounds has been replaced by methacrylate; diacrylate compounds linked with a chain containing an aromatic group and ether bond, including, for example, polyoxyethylene (2)-2,2-bis(4-hydroxyphenyl)propane diacrylate, polyoxyethylene (4)-2,2-bis(4-hydroxyphenyl)propane diacrylate, and those in which the acrylate in each of the above compounds has been replaced by methacrylate; diacrylate compounds of a polyester type, including, for example, MANDA (trade name, available from Nippon Kayaku Co., Ltd.). Polyfunctional cross-linking agents include pentaerythritol triacrylate, trimethylolethane triacrylate, trimethylolpropane triacrylate, tetramethylolmethane tetraacrylate, oligoester acrylate, and those in which the acrylate in each of the above compounds has been replaced by methacrylate; triallyl cyanurate, and triallyl trimellitate.

These cross-linking agents may be used in an amount of from 0.01 to 5% by weight, and more preferably from 0.03 to 3% by weight, based on 100% by weight of other monomer components.

Of these cross-linkable monomers, what are preferably used in the resins for toners from the viewpoint of fixing properties and offset resistance include the aromatic divinyl compounds (in particular, divinyl benzene) and the diacrylate compounds linked with a chain containing an aromatic group and ether bond.

Selection of a polymerization initiator, the type of solvents and the conditions for reaction, used when the resin of the present invention is prepared, is an important factor for obtaining the resin as intended in the present invention. The initiator includes, for example, organic peroxides such as benzoyl peroxide, 1,1-di(t-butylperoxy)-3,3,5-trimethylcyclohexane, n-butyl-4,4-di(t-butylperoxy)valerate, dicumyl peroxide, α,α'-bis(t-butylperoxydiisopropyl)benzene, t-butylperoxycumene, and di-t-butyl peroxide; and azo or diazo compounds such as azobisisobutylonitrile, and diazoaminoazobenzene.

The resin of the present invention can have a glass transition point which is reasonably different depending on the types or composition of monomers. It may effectively have a glass transition point ranging from 40° to 80° C. More preferably a binder resin having a glass transition point of from 50° to 65° C. is preferred from the viewpoint of blocking resistance and fixing properties. A resin with a glass transition point lower than 40° C. greatly tends to cause thermal agglomeration or caking during the storage of a toner and hence tends to cause troubles due to the agglomeration of a toner in a copying machine. On the other hand, a resin with a glass transition point higher than 80° C. tends to lower the heat fixing efficiency of a toner.

In the process for producing the binder resin of the present invention, a first-stage resin (a polymer or copolymer) is prepared by solution polymerization. Then, the first-stage resin is dissolved in a polymerizable monomer. At this time, another resin may be simultaneously dissolved. The polymerizable monomer is subjected to suspension polymerization in the presence of the resin and a cross-linking agent. The first-stage resin may be dissolved in an amount of from 5 to 100 parts by weight, and preferably from 10 to 80 parts by weight, based on 100 parts by weight of the monomer used for the suspension polymerization. In the suspension polymerization, a cross-linking agent may preferably be used in an amount of from about 0.1 to about 2.0% by weight based on the monomer subjected to suspension polymerization. It is permissible to make some variations on these conditions depending on the types of polymerization initiators and the reaction temperatures.

It is found that the binder resin obtained by dissolving the first-stage polymer or copolymer in a monomer followed by suspension polymerization differs from a blended-resin composition obtained by merely blending i) a polymer or copolymer obtained by suspension polymerization without dissolving the first-stage polymer or copolymer and ii) the first-stage polymer or copolymer.

The difference is that the former has a little broader high-molecular weight distribution than the latter in the chromatogram obtained by GPC of a THF-soluble matter. In the former, a component with a molecular weight of not less than 300,000 holds 3 to 25% by weight of the whole resin, which is apparently larger than the latter. It is presumed that the first-stage polymer or copolymer, having been dissolved, has an influence on the suspension polymerization, and this brings about an effect together with the merit of a uniform blend of polymers. This will be described in greater detail with reference to GPC charts shown in the accompanying drawings.

Figure 4:
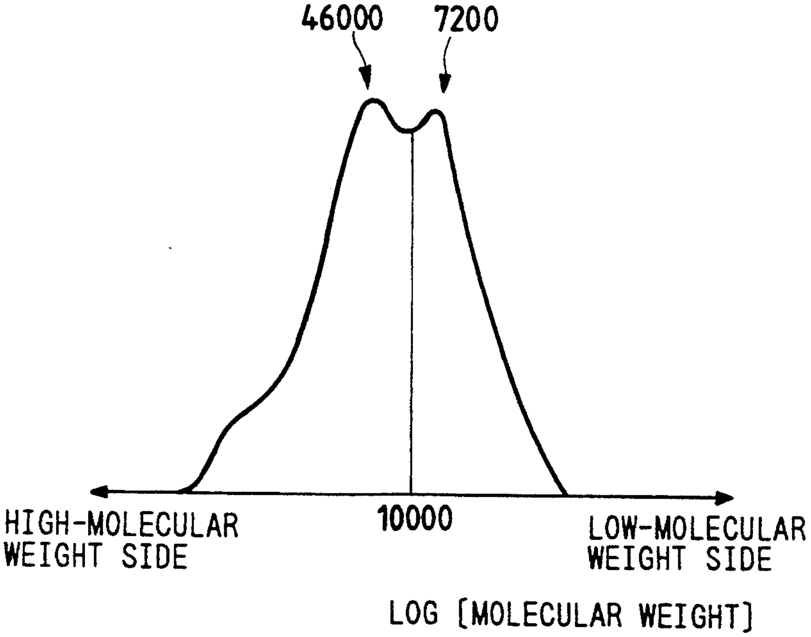
FIG. 4 shows a chart of GPC of a THF-soluble matter in binder resin A used in Example 1.
Figure 5:
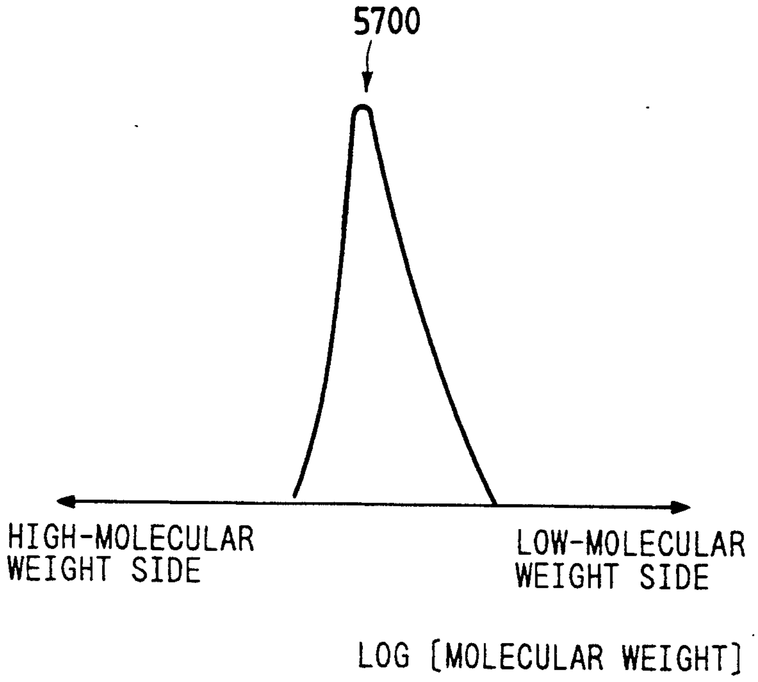
FIG. 5 shows a chart of GPC of copolymer (a) used in Example 1.
Figure 6:
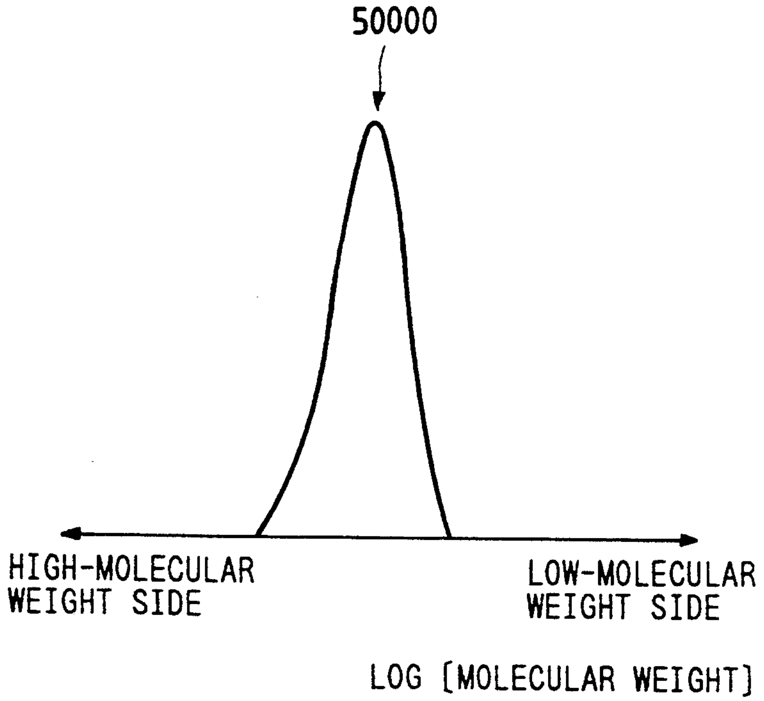
FIG. 6 shows a chart of GPC of a THF-soluble matter in the product obtained by suspension polymerization of monomers alone which have been used in the second-stage polymerization, used in Example 1.

In the accompanying drawings, FIG. 4 shows a chart of GPC of a THF-soluble matter in the resin composition obtained in Example 1 as will be described later. FIG. 5 shows a chart of GPC of a copolymer prepared by solution polymerization corresponding to the first-stage polymerization in Example 1. Such copolymer is soluble in THF, and also soluble in a styrene monomer and a n-butyl acrylate monomer which are polymerizable monomers. It has a main peak at a molecular weight of 5,700. FIG. 6 shows a chart of GPC of a THF-soluble matter in the product obtained by suspension polymerization of a second-stage copolymer prepared in the second-stage polymerization under the same conditions except for no addition of the above copolymer. The second-stage copolymer has a main peak at a molecular weight of 50,000.

Figure 7:
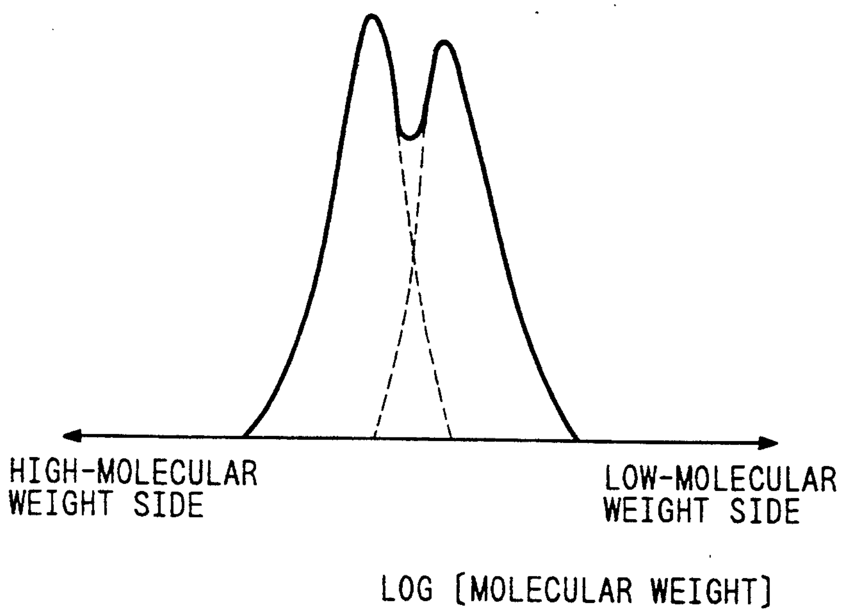
FIG. 7 is a combination of the charts shown in FIGS. 5 and 6.

FIG. 7 is a combination of the chart of FIG. 5 and the chart of FIG. 6.

Figure 8:
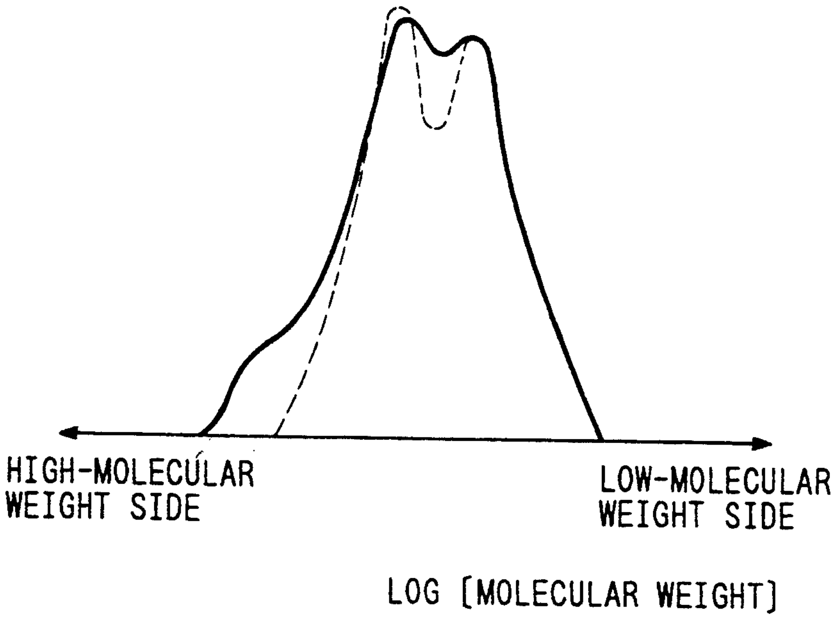
FIG. 8 shows a chart for the comparison between FIG. 4 and FIG. 7.

FIG. 8 is a chart showing a combination of the chart of FIG. 4 and the chart of FIG. 7 (the solid line is replaced by a dotted line). As will be apparent from FIG. 8, the resin composition obtained in Example 1 according to the present invention gives a GPC chart different from that of a mere blend of the first-stage copolymer and the second-stage copolymer. In particular, a high-molecular weight component that has not been formed when the second-stage copolymer is used alone is seen to have been formed on the high-molecular weight side. As to this high-molecular weight component, it is presumed that, since the copolymer prepared in the first-stage solution polymerization is present at the time of the suspension polymerization corresponding to the second-stage polymerization, such copolymer has acted as a polymerization regulator and consequently the synthesis of the THF-insoluble matter and THF-soluble matter in the second-stage copolymer has been regulated. The resin composition according to the present invention comprises a uniform blend of a THF-insoluble matter, a THF-soluble high-molecular weight component, a THF-soluble intermediate-molecular weight component and a THF-soluble low-molecular weight component.

In the present invention, a component with a molecular weight of not less than 300,000 according to the GPC of a THF-soluble matter of a toner may preferably be contained in an amount of from 5 to 30% by weight, and preferably from 10 to 30% by weight, based on the binder resin. A product having a clear peak in the region of a molecular weight of not less than 300,000, and preferably not less than 500,000, according to the GPC of a THF-soluble matter of a toner is more preferred from the viewpoint of the improvement in offset resistance and wind-around resistance.

The solution polymerization and suspension polymerization according to the present invention will be described below.

A solvent used in the solution polymerization includes xylene, toluene, cumene, cellosolve acetate, isopropyl alcohol and benzene. In the case of a styrene monomer, xylene, toluene or cumene may preferably be used. These organic solvents may be appropriately selected depending on the polymer to be formed by polymerization. A polymerization initiator includes di-tert-butyl peroxide, tert-butyl peroxybenzoate, benzoyl peroxide, 2,2'-azobisisobutyronitrile, 2,2'-azobis(2,4-dimethylvaleronitrile), which may be used in a concentration of not less than 0.05 part by weight, and preferably from 0.1 to 15 parts by weight, based on 100 parts by weight of monomer. The reaction should be carried out at a temperature of usually from 70° C. to 230° C., though variable depending on the types of solvents used, polymerization initiators and polymers to be formed. The solution polymerization may preferably be carried out using monomers in an amount of from 30 parts by weight to 400 parts by weight based on 100 parts by weight of the organic solvent.

Dicarboxylic acids and dicarboxylic monoesters can be formed into anhydrides when the solvent is evaporated by heating after the solution polymerization, so that the acid anhydride group (acid anhydride unit) can be provided in the binder resin. Then, the formation into anhydrides can be controlled by selecting the conditions under which the heating and evaporation are carried at this time.

The suspension polymerization may be carried out using a monomer mixture in an amount of not more than 100 parts by weight, and preferably from 10 to 90 parts by weight, based on 100 parts by weight of an aqueous medium. A dispersant usable in the present invention includes polyvinyl alcohol, partially saponified polyvinyl alcohol, and calcium phosphate. An appropriate amount thereof depends on the amount of monomers based on the aqueous medium. The dispersant may usually be used in an amount of from 0.05 to 1 part by weight based on 100 parts by weight of the aqueous medium. It is suited for the polymerization to be carried out at a temperature of from 50° to 95° C.

The temperature should be appropriately selected depending on the types of polymerization initiators used and polymers to be obtained. Any polymerization initiators can be used so long as they are insoluble or slightly soluble in water. For example, polymerization initiators such as benzoyl peroxide and tert-butyl peroxyhexanoate may preferably be used in an amount of from 0.1 to 10 parts by weight based on 100 parts by weight of monomers.

Using the dispersant in an amount of from 0.05 to 3.0 parts by weight based on 100 parts by weight of the aqueous medium, an emulsion may preferably be made to have a volume average particle diameter of not more than 100 μm by means of an emulsifier such as a homomixer or an ultrasonic dispersion machine.

At the time of this suspension polymerization, part of acid anhydride groups previously formed is then ring-opened to form dicarboxyl groups, so that this functional group can be provided in the binder resin.

The ring-opening of the acid anhydride group can be controlled by selecting the particle diameter of the emulsion, the conditions for polymerization and the conditions for post-treatment. In particular, the rate of ring-opening can be made uniform when the emulsion is made to have a uniform particle diameter of not more than 100 μm. This is thus more preferred.

Incidentally, infrared absorption can be utilized to confirm the formation of acid anhydride groups and dicarboxyl groups. Since the IR absorption peak of the carbonyl of an acid anhydride group appears at about 1,750 to 1,850 $cm^{-1}$, an increase or decrease of absorption peaks before and after each polymerization may be observed to thereby confirm whether an acid anhydride has been formed or a dicarboxylic acid has been formed as a result of the ring-opening. The vinyl type dicarboxylic acid monomers and the vinyl type dicarboxylic acid anhydride monomers have a strong alternating polymerizability, but in the production process of the present invention it is possible to obtain a vinyl copolymer in which the functional groups such as dicarboxylic acid anhydride groups have been dispersed at random. It is the process in which a vinyl copolymer is obtained by solution polymerization using vinyl type dicarboxylic acid monoester monomers, and then this vinyl copolymer is dissolved in a monomer to carry out suspension polymerization to obtain a binder resin. According to this process, dicarboxylic acid monoester moieties can be ring-closed by removal of alcohols and formed into anhydrides when the solvent is removed after the solution polymerization, to give acid anhydride groups. At the time of the suspension polymerization, acid anhydride groups are ring-opened by hydrolysis to give dicarboxylic acid groups. The binder resin obtained in this way is comprised of the acid anhydride group, the carboxyl group and the dicarboxyl group which are dispersed in the binder resin at random and in a uniform state, and hence it can be more effectively achieved to improve fixing properties, improve blocking resistance and make chargeability uniform.

The toner in which the binder resin prepared in the present invention is employed may contain in addition to the above binder resin components the following materials in an amount less than the content of the binder resin components.

For example, they include silicone resins, polyesters, polyurethanes, polyamides, epoxy resins, polyvinyl butyral, rosins, modified rosins, terpene resins, phenol resins, aliphatic or alicyclic hydrocarbon resins such as low-molecular weight polyethylenes or low-molecular weight polypropylenes, aromatic petroleum resins, chlorinated paraffin, and paraffin wax.

A method of qualitatively and quantitatively determining the functional groups in the binder resin according to the present invention includes methods in which the infrared absorption spectrum, the acid value measurement according to JIS K-0070, the hydrolysis acid value measurement (total acid value measurement), the nuclear magnetic resonance spectrum or the like is applied.

For example, in the infrared absorption, an absorption peak assigned to the carbonyl of an acid anhydride group appears in the vicinity of 1,780 $cm^{-1}$, and thus the presence of the acid anhydride group can be confirmed.

In the acid value measurement according to JIS K-0070 (hereinafter "JIS acid value"), about 50% of the theoretical value of an acid anhydride can be measured (the acid anhydride is regarded to have an acid value as dicarboxylic acid).

As for the total acid measurement, the acid value can be measured substantially as the theoretical value is. Thus, the difference between the total acid value and the JIS acid value is about 50% of the theoretical value, and the acid anhydride group is measured as a dibasic acid group. Hence, the total acid value ascribable to acid anhydride groups per 1 g can be determined.

The following equation can be given:

$$AV_{TA}=2\times(AV_{TR}-AV_{JR})$$

wherein $AV_{TA}$ represents the total acid value ascribable to acid anhydride groups, $AV_{TR}$ represents the total acid value of the whole binder resin, and $AV_{JR}$ represents the JIS acid value of the whole binder resin. The percentage (%) held by $AV_{TA}$ in $AV_{TR}$ is represented by $(AV_{TA}/AV_{TR})\times 100$.

In the present invention, the total acid value is determined in the following way:

In 30 ml of dioxane, 2 g of a sample resin is dissolved, to which 10 ml of pyridine, 20 mg of dimethylaminopyridine and 3.5 ml of water are added. These are refluxed under heating for 4 hours with stirring. After cooled, the sample solution is neutralized and titrated with a 1/10N KOH-THF solution, using phenolphthalein as an indicator. The resulting acid value is regarded as the total acid value ($AV_{TA}$). The 1/10N KOH-THF solution is prepared in the following way: In about 3 ml of water, 1.5 g of KOH is dissolved, to which 200 ml of THF and 30 ml of water are added, and these are stirred. After the solution is left to stand, a small amount of methanol is added if it has been separated and a small amount of water is added if it has become turbid, thereby making up a homogeneous and transparent solution. This solution is standardized with a 1/10N HCl standard solution.

An outline of the method of measuring acid values according to JIS K-0070 is as described below.

In the measurement of acid values, the following reagent is used.

Reagent:

(a) Solvent:

A mixed solvent of ethyl ether and ethyl alcohol (1:1 or 2:1) or a mixed solvent of benzene and ethyl alcohol (1:1 or 2:1). These solutions are each neutralized with a N/10 potassium hydroxide-ethyl alcohol solution immediately before its use, using phenolphthalein as an indicator.

(b) Phenolphthalein solution:

In 100 ml of ethyl alcohol (95 v/v %), 1 g of phenolphthalein is dissolved.

(c) N/10 potassium hydroxide-ethyl alcohol solution:

In water used in an amount as small as possible, 7.0 g of potassium hydroxide is dissolved, to which ethyl alcohol (95 v/v %) is added to make up one liter of solution. The solution is left for 2 to 3 days, and thereafter filtered. The solution is standardized according to JIS K-8006.

A procedure for the method of measuring acid values is as described below.

A sample is precisely weighed, and 100 ml of a solvent and several drops of a phenolphthalein solution are added to the sample, followed by thorough shaking until the sample is completely dissolved. In the case of a solid sample, it is dissolved by heating on a water bath. After cooled, the sample is titrated with the N/10 potassium hydroxide-ethyl alcohol solution, and neutralization is regarded to have reached the end point when the indicator continued rendering a pale red color for 30 minutes.

The acid value is calculated according to the following equation.

$$A = \frac{B \times f \times 5.611}{S}$$

wherein,

A is an acid value;

B is an amount (ml) of the N/10 potassium hydroxide-ethyl alcohol solution used;

f is a factor of the N/10 potassium hydroxide-ethyl alcohol solution; and

S is a sample (g).

The present invention will be described below in greater detail by giving Examples. These by no means restrict the present invention. In the following, "part(s)" refers to "part(s) by weight".

EXAMPLE 1

| | |
|---|---|
| Styrene monomer | 75.5 parts |
| Butyl acrylate monomer | 13.5 parts |
| Monobutyl maleate monomer | 10.0 parts |
| Di-tert-butyl peroxide | 6.0 parts |

In a reaction vessel, 200 parts of cumene was introduced, and the temperature was raised to a reflux temperature. The above mixture was dropwise added thereto over a period of 6 hours under reflux of cumene. Under further reflux of cumene (146° C. to 156° C.), polymerization was completed and the temperature was raised to 200° C. while removing cumene under reduced pressure.

The resulting copolymer (a) was capable of dissolving in THF, and had an Mw of 6,200, an Mn of 2,600, an Mw/Mn of 2.38, a main peak at a molecular weight of 5,700 as measured by GPC, and a Tg of 60.8° C. Its molecular weight distribution measured by GPC is shown in FIG. 5.

| | |
|---|---|
| Copolymer (a) | 30.0 parts |
| Styrene monomer | 46.0 parts |
| Butyl acrylate monomer | 21.0 parts |
| Monobutyl maleate monomer | 3.0 parts |
| Divinylbenzene | 0.3 part |
| Benzoyl peroxide | 1.0 part |
| tert-Butylperoxy-2-ethylhexanoate | 0.6 part |

In a solution of the above mixture, 170 parts of water in which 0.12 part of partially saponified polyvinyl alcohol was dissolved was added, followed by emulsification using a homomixer so as for the resulting emulsion to have a particle diameter of not more than 100μ. A suspension dispersion was thus obtained. This dispersion was added in a reaction vessel containing 50 parts of water and substituted with nitrogen, and suspension polymerization was carried out at reaction temperatures of from 70° to 95° C. for 6 hours. After completion of the reaction, the reaction mixture was filtered, dehydrated and dried to give a resin composition A. In this composition A, a THF-insoluble matter and a THF-soluble matter were in a uniformly mixed state and the copolymer (a) was also in a uniformly mixed state. The THF-insoluble matter in the resulting resin composition (a resin composition powder of 24 mesh-pass and 60 mesh-on was used) was in an amount of 29% by weight.

The THF-insoluble matter of the resin composition was measured in the following manner.

The resin composition was weighed in an amount of about 0.5 g ($W_1$ g), which was then put in a cylindrical filter paper (No. 86 R: 28×100 mm, available from Toyo Roshi K.K.) and set on a Soxhlet extractor. Extraction was carried out for 6 hours using 200 ml of THF as a solvent. The extraction of THF in the Soxhlet extractor was carried out at a cycle of once per about 4 minutes. The THF-soluble component extracted by THF was evaporated, followed by drying at 100° C. under reduced pressure. Then the THF-soluble resin component was weighed ($W_2$ g).

$$\text{THF-insoluble matter (\%)} = (W_1 - W_2)/W_1 \times 100$$

The molecular weight distribution of the THF-soluble matters was measured to reveal that it had peaks at molecular weights of 7,200 and 46,000, respectively, and had an Mn of 6,100, an Mw of 145,000, and an Mw/Mn of 23.8. The component with a molecular weight of not more than 10,000 was in an amount of 25% by weight. It was also confirmed that the Tg of the resin was 56.3° C. and the glass transition point $Tg_1$ of the component with a molecular weight of not more than 10,000, fractionated by GPC, was 60.5° C.

A GPC chromatogram of the THF-soluble matter is shown in FIG. 4.

The characteristics concerned with the molecular weight of each resins and resin composition were measured by the following method.

Using Shodex KF-80M as GPC columns, which were set in a 40° C. heat chamber of a GPC apparatus (150 C. ALC/GPC, manufactured by Waters Co.), GPC was carried out by injecting 200 μl of a sample (concentration of THF-soluble matter: about 0.1% by weight) under conditions of a THF flow rate of 1 ml/min, using an RI detector as a detector. To prepare the calibration curve for the measurement of molecular weight, a THF solution of a monodisperse polystyrene standard substance (available from Waters Co.) comprised of 10 samples with molecular weights of $0.5\times10^3$, $2.35\times10^3$, $10.2\times10^3$, $35\times10^3$, $110\times10^3$, $200\times10^3$, $470\times10^3$, $1,200\times10^3$, $2,700\times10^3$ and $8,420\times10^3$.

Figure 9:
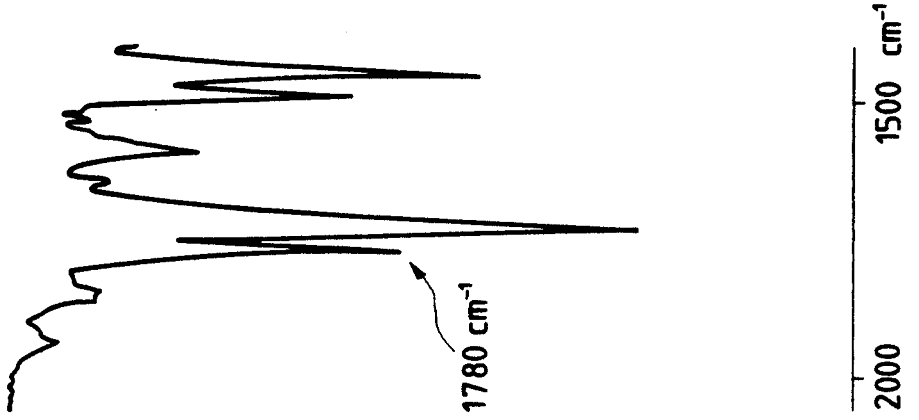
FIGS. 9, 10 and 11 each show part of a chart for an infrared spectrum of a resin.
Figure 10:
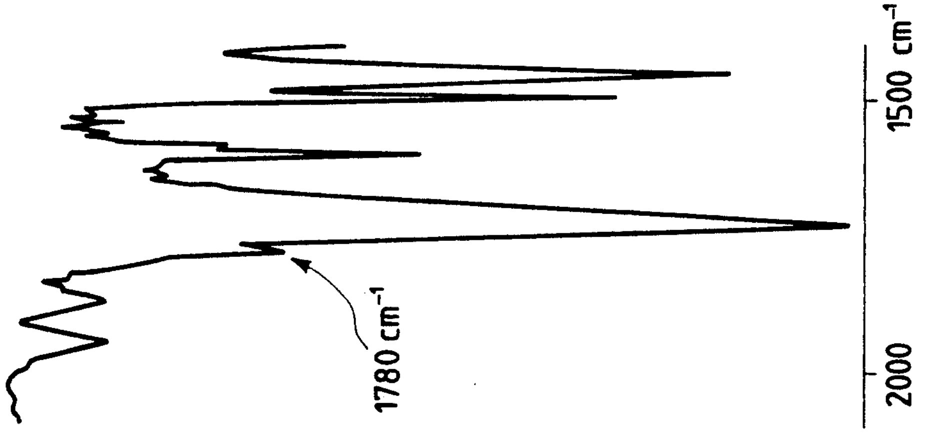
Figure 11:
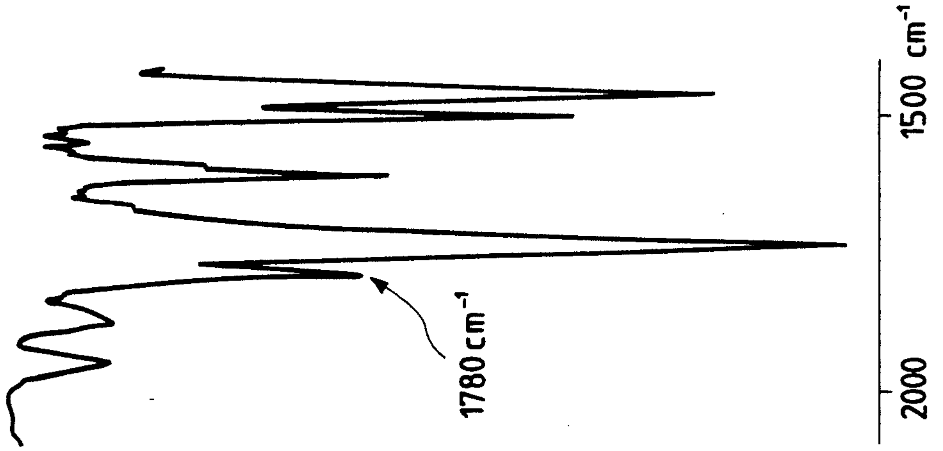

FIG. 9 shows an IR absorption spectrum of the copolymer (a), and FIG. 10 shows an IR absorption spectrum of the binder resin composition A. FIG. 11 shows an IR absorption spectrum measured when the copolymer (a) was diluted to 3/10 with a styrene-acrylate copolymer.

As to the absorption peak (1780 $cm^{-1}$) assigned to the carbonyl of the acid anhydride group, that of the resin A shows a decrease in its intensity compared with that of the diluted and mixed one, and thus part of acid anhydride groups is seen to have hydrolyzed and changed to dicarboxylic acid groups. Tables 1 and 2 show the total acid value of the binder resin composition, the JIS acid value of the same, the total acid value ascribable to acid anhydride groups, the proportion of acid anhydride groups to the total acid value of the whole resin, and other physical properties.

EXAMPLE 2

In a reaction vessel, 200 parts of cumene was introduced, and the temperature was raised to a reflux temperature. The following mixture was dropwise added thereto over a period of 6 hours under reflux of cumene.

| | |
|---|---|
| Styrene monomer | 70.5 parts |
| Butyl acrylate monomer | 17.5 parts |
| Monobutyl maleate monomer | 15.0 parts |

-continued

| | |
|---|---|
| Di-tert-butyl peroxide | 2.0 parts |

Under further reflux of cumene (146° C. to 156° C.), the polymerization was completed, and the cumene was removed under heating and reduced pressure. The resulting copolymer (b) had an Mw of 9,900, an Mw/Mn of 2.52, a main peak at a molecular weight of 9,700 in the chart of GPC, and a Tg of 60.7° C.

| | |
|---|---|
| Copolymer (b) | 30.0 parts |
| Styrene monomer | 45.0 parts |
| Butyl acrylate | 20.0 parts |
| Monobutyl maleate | 5.0 parts |
| Divinylbenzene | 0.35 part |
| Benzoyl peroxide | 1.2 parts |
| tert-Butylperoxy-2-ethylhexanoate | 0.4 part |

In a solution of the above mixture, 170 parts of water in which 0.12 part of partially saponified polyvinyl alcohol was dissolved was added, followed by thorough emulsification to give a suspension dispersion. This dispersion was added in a reaction vessel containing 50 parts of water and substituted with nitrogen, and reaction was carried out at reaction temperatures of from 70° to 95° C. for 6 hours. After completion of the reaction, the reaction mixture was filtered, dehydrated and dried to give a binder resin composition B. Tables 1 and 2 show physical properties of this composition B.

EXAMPLE 3

In a reaction vessel, 200 parts of xylene was introduced, and the temperature was raised to a reflux temperature. The following mixture was dropwise added thereto over a period of 6 hours under reflux of xylene.

| | |
|---|---|
| Styrene monomer | 80.0 parts |
| Butyl acrylate monomer | 14.5 parts |
| Monobutyl maleate monomer | 5.0 parts |
| Divinylbenzene | 5.0 parts |
| Di-tert-butyl peroxide | 8.0 parts |

Under further reflux of xylene (135° C. to 145° C.), the polymerization was completed and the xylene was removed under heating and reduced pressure. The resulting copolymer (c) had an Mw of 12,000, an Mw/Mn of 3.75, a main peak at a molecular weight of 5,800, and a Tg of 60.2° C.

| | |
|---|---|
| Copolymer (c) | 40.0 parts |
| Styrene monomer | 43.0 parts |
| 2-Ethylhexyl acrylate monomer | 15.0 parts |
| Monobutyl maleate monomer | 2.0 parts |
| Divinylbenzene | 0.40 part |
| Benzoyl peroxide | 0.80 part |
| tert-Butylperoxy-hexanoate | 0.60 part |

In a solution of the above mixture, 170 parts of water in which 0.12 part of partially saponified polyvinyl alcohol was dissolved was added, followed by thorough emulsification to give a suspension dispersion. This dispersion was added in a reaction vessel containing 50 parts of water and substituted with nitrogen, and reaction was carried out at reaction temperatures of from 70° to 95° C. for 6 hours. After completion of the reaction, the reaction mixture was filtered, dehydrated and dried to give a binder resin composition C. Tables 1 and 2 show physical properties thereof.

EXAMPLE 4

In a reaction vessel, 200 parts of xylene was introduced, and the temperature was raised to a reflux temperature. The following mixture was dropwise added thereto over a period of 6 hours under reflux of xylene.

| | |
|---|---|
| Styrene monomer | 76.0 parts |
| Butyl acrylate monomer | 14.0 parts |
| Monobutyl fumarate monomer | 10.0 parts |
| Di-tert-butyl peroxide | 8.0 parts |

Under further reflux of xylene (135° C. to 145° C.), the polymerization was completed and the xylene was removed under heating and reduced pressure. The resulting copolymer (d) had an Mw of 38,000, an Mw/Mn of 2.57, a main peak at a molecular weight of 3,400, and a Tg of 59.7° C.

| | |
|---|---|
| Copolymer (d) | 30.0 parts |
| Styrene | 46.0 parts |
| Butyl acrylate | 21.0 parts |
| Monobutyl fumarate | 3.0 parts |
| Divinylbenzene | 0.25 part |
| Benzoyl peroxide | 1.7 parts |

In the above mixture, 170 parts of water in which 0.12 part of partially saponified polyvinyl alcohol was dissolved was added, followed by thorough emulsification to give a suspension dispersion. This dispersion was added in a reaction vessel containing 50 parts of water and substituted with nitrogen, and reaction was carried out at reaction temperatures of from 70° to 95° C. for 6 hours. After completion of the reaction, the reaction mixture was filtered, dehydrated and dried to give a binder resin composition D. Tables 1 and 2 show physical properties thereof.

EXAMPLE 5

In a reaction vessel, 150 parts of cumene was introduced, and the temperature was raised to a reflux temperature. The following mixture was dropwise added thereto over a period of 6 hours under reflux of cumene.

| | |
|---|---|
| Styrene monomer | 80.0 parts |
| Butyl acrylate monomer | 10.0 parts |
| Monobutyl-n-butenyl succinate monomer | 10.0 parts |
| Di-tert-butyl peroxide | 6.0 parts |

Under further reflux of cumene (146° C. to 156° C.), the polymerization was completed, and the cumene was removed under heating and reduced pressure. The resulting copolymer (e) had an Mw of 6,200, an Mw/Mn of 2.12, a main peak at a molecular weight of 4,700 in the chart of GPC, and a Tg of 62.1° C.

| | |
|---|---|
| Copolymer (e) | 30.0 parts |
| Styrene monomer | 42.0 parts |
| Butyl methacrylate monomer | 25.0 parts |
| Monobutyl maleate monomer | 3.0 parts |
| Divinylbenzene | 0.35 part |
| Benzoyl peroxide | 1.0 part |

-continued

| | |
|---|---|
| tert-Butylperoxy-2-ethylhexanoate | 0.6 part |

In the above mixture, 170 parts of water in which 0.12 part of partially saponified polyvinyl alcohol was dissolved was added, followed by thorough emulsification to give a suspension dispersion. This dispersion was added in a reaction vessel containing 50 parts of water and substituted with nitrogen, and reaction was carried out at reaction temperatures of from 70° to 95° C. for 6 hours. After completion of the reaction, the reaction mixture was filtered, dehydrated and dried to give a binder resin composition E. Tables 1 and 2 show physical properties thereof.

EXAMPLE 6

| | |
|---|---|
| Copolymer (a) | 20.0 parts |
| Cross-linked polyester (acid value: 16; Tg: 58° C.; Mw: 50,000) | 20.0 parts |
| Styrene monomer | 42.0 parts |
| Butyl acrylate monomer | 18.0 parts |
| Monobutyl maleate monomer | 4.0 parts |
| Divinylbenzene | 0.35 part |
| Benzoyl peroxide | 1.0 part |
| tert-Butyl-peroxy-2-ethylhexanoate | 0.6 part |

In a solution of the above mixture, 170 parts of water in which 0.12 part of partially saponified polyvinyl alcohol was dissolved was added, followed by thorough emulsification to give a suspension dispersion. This dispersion was added in a reaction vessel containing 50 parts of water and substituted with nitrogen, and reaction was carried out at reaction temperatures of from 70° to 95° C. for 6 hours. After completion of the reaction, the reaction mixture was filtered, dehydrated and dried to give a binder resin composition F. Tables 1 and 2 show physical properties thereof.

EXAMPLE 7

| | |
|---|---|
| Copolymer (b) | 30.0 parts |
| Styrene monomer | 49.0 parts |
| Butyl acrylate monomer | 21.0 parts |
| Divinylbenzene | 0.35 part |
| Benzoyl peroxide | 1.2 parts |
| tert-Butyl-peroxy-2-ethylhexanoate | 0.4 part |

In a solution of the above mixture, 170 parts of water in which 0.12 part of partially saponified polyvinyl alcohol was dissolved was added, followed by thorough emulsification to give a suspension dispersion. This dispersion was added in a reaction vessel containing 50 parts of water and substituted with nitrogen, and reaction was carried out at reaction temperatures of from 70° to 95° C. for 6 hours. After completion of the reaction, the reaction mixture was filtered, dehydrated and dried to give a binder resin composition G. Tables 1 and 2 show physical properties thereof.

COMPARATIVE EXAMPLE 1

| | |
|---|---|
| Styrene monomer | 72.0 parts |
| Butyl acrylate monomer | 24.0 parts |
| Monobutyl maleate monomer | 4.0 parts |
| Divinylbenzene | 0.30 part |
| Benzoyl peroxide | 1.7 parts |

In the above mixture, 170 parts of water in which 0.12 part of partially saponified polyvinyl alcohol was dissolved was added, followed by thorough emulsification to give a suspension dispersion. This dispersion was added in a reaction vessel containing 50 parts of water and substituted with nitrogen, and reaction was carried out at reaction temperatures of from 70° to 95° C. for 6 hours. After completion of the reaction, the reaction mixture was filtered, dehydrated and dried to give a binder resin composition H. Tables 1 and 2 show physical properties thereof.

COMPARATIVE EXAMPLE 2

In a reaction vessel, 200 parts of cumene was introduced, and the temperature was raised to a reflux temperature. The following mixture was dropwise added thereto over a period of 6 hours under reflux of cumene.

| | |
|---|---|
| Styrene | 90.0 parts |
| Butyl acrylate | 10.0 parts |
| Di-tert-butyl peroxide | 6.0 parts |

Under further reflux of cumene (146° C. to 156° C.), the polymerization was completed, and the cumene was removed under heating and reduced pressure. The resulting copolymer (i) had an Mw of 4,100, an Mw/Mn of 2.63, a main peak at a molecular weight of 4,600 in the chart of GPC, and a Tg of 59.3° C.

| | |
|---|---|
| Copolymer (i) | 30.0 parts |
| Styrene | 49.0 parts |
| Butyl acrylate | 21.0 parts |
| Divinylbenzene | 0.35 part |
| Benzoyl peroxide | 1.0 part |
| tert-Butylperoxy-2-ethylhexanoate | 0.6 part |

In a solution of the above mixture, 170 parts of water in which 0.12 part of partially saponified polyvinyl alcohol was dissolved was added, followed by thorough emulsification to give a suspension dispersion. This dispersion was added in a reaction vessel containing 50 parts of water and substituted with nitrogen, and reaction was carried out at reaction temperatures of from 70° to 95° C. for 6 hours. After completion of the reaction, the reaction mixture was filtered, dehydrated and dried to give a binder resin composition I. Tables 1 and 2 show physical properties thereof.

EXPERIMENT 1

| | |
|---|---|
| Binder resin A (Example 1) | 100 parts |
| Magnetic iron oxide | 60 parts |
| Low-molecular weight ethylene-propylene copolymer | 3 part |
| 3,5-Di-tert-butylsalicylic acid chromium complex | 2 parts |

The above materials were pre-blended using a Henschel mixer, and thereafter melt-kneaded at 130° C. with a twin kneading extruder. The kneaded product was cooled and then crushed with a cutter mill. Thereafter, the crushed product was pulverized using a fine grinding mill making use of a jet stream, and further classified using an air classifier to give a black fine powder (a toner) with a volume average particle diameter of 11.0 μm.

The grindability of this toner material was so good that it gave a value of 4.0 kg/hr as a throughput for obtaining the toner with a volume average particle diameter of 11 μm. There occurred no fusion inside the grinding mill.

A developer obtained by mixing 0.4 part of hydrophobic dry silica in 100 parts of this toner was put in a commercially available electrophotographic copying machine NP-8580 (manufactured by Canon Inc.), and evaluation was made on image quality and fixing performance.

Running for 100,000 sheet copying was carried out. Good images with a high image density were stably obtained. The toner showed very good fixing properties, and also good offset resistance and wind-around resistance. The fixing roller was not soiled. In addition, no filming or fusing to the photosensitive member occurred, and also there was seen superior blocking resistance.

After running for 100,000 sheet copying, the toner was successively left for a day or more in an environment of 32.5° C., 85% RH, and then in an environment of 15° C., 10% RH. After the toner was made well adapted to each environment, running for 50,000 sheet copying was carried out in each environment. Good images were obtained like the running carried out in an environment of normal temperature and normal humidity (20° C. to 25° C., 50% RH to 70% RH), and there occurred no troubles.

Results of the evaluation are shown in Tables 3 and 4.

EXPERIMENTS 2 TO 7

Toners were obtained in the same manner as in Experiment 1 except for using binder resins B, C, D, E, F and G, respectively. Evaluation was made in the same manner as in Experiment 1 to obtain the results as shown in Tables 3 and 4.

COMPARATIVE EXPERIMENTS 1 AND 2

Toners were obtained in the same manner as in Experiment 1 except for using binder resins H and I, respectively. Evaluation was made in the same manner as in Experiment 1 to obtain the results as shown in Tables 3 and 4.

Evaluation method:

The grindability of toner materials was on the basis of the throughput per unit time, when the materials were processed using a fine grinding mill of 2 $m^3$/min making use of a jet stream, under air pressure of 5 kg/$cm^2$. At the same time, the inner wall of the fine grinding mill was observed to examine whether or not the fusion occurred.

The fixing properties, offset resistance, wind-around resistance, image quality and durability were examined using NP-8580, a copying machine manufactured by Canon Inc.

The blocking resistance was examined on the basis of the changes in the degree of agglomeration when about 10 g of a toner was placed in a polyethylene cup of 100 cc and left at 50° C. for 3 days. The degree of agglomeration was measured with a powder tester manufactured by Hosokawa Micron Corporation. The index of blocking is based on the difference in the degree of agglomeration between a product left at room temperature and a product left at 50° C. for 3 days.

The evaluation on the fixing properties, offset resistance, wind-around resistance, image quality and durability was made according to the following procedures.

As to the fixing properties, the copying machine used for evaluation was left overnight in an environment of low temperature and low humidity (15° C., 10% RH), and copied images were continuously obtained on 200 sheets after the copying machine and a fixing device provided therein became perfectly adapted to the environment of low temperature and low humidity. The copied image on the 200th sheet was used for the evaluation of fixing properties. For the evaluation of fixing properties, the image was rubbed 10 times under a load of about 100 g using a lens cleaning paper (tradename: dusper, manufactured by OZU Paper Co., Ltd.), and peeling of the image was expressed as a rate (%) of lowering of reflection density.

In particular, as to the offset resistance, a cleaning mechanism for a fixing roller was detached to examine how many sheets of copies were taken until an image was stained or the roller was contaminated, and the offset resistance was evaluated based on the number of sheets of such copies.

It is possible that the toner once cleaned off onto a cleaning web is transferred to an upper roller to stain copies, depending on the state of contamination of the cleaning web when copies are continuously taken. Accordingly, in order to take account of this for the evaluation, the cleaning mechanism for the fixing roller was restored to a normal state, where copied images were continuously obtained on 200 sheets, and thereafter copies were taken for 3 minutes at intervals of 30 seconds for each sheet to examine whether or not image stains occurred and also examine the state of contamination of the cleaning web for the fixing roller. The results were evaluated as A (excellent), B (good), C (passable) or F (failure).

In regard to the wind-around resistance, the number of curled sheets was regarded as the index for the evaluation of the wind-around resistance, in an instance in which an image copied sheet having passed a fixing roller curled in a leaned state when an entirely black solid image was continuously copied on 30 sheets of paper.

TABLE 1

| | | Total acid value of resin | JIS acid value of resin | (1) | (2) | (3) |
|---|---|---|---|---|---|---|
| Example: | | | | | | |
| 1 | Resin A | 22.7 | 20.5 | 4.4 | 19% | Yes |
| 2 | Resin B | 33.9 | 33.0 | 1.8 | 5% | Yes |
| 3 | Resin C | 12.8 | 12.2 | 1.2 | 9% | Yes |
| 4 | Resin D | 21.6 | 21.1 | 1.0 | 5% | Yes |
| 5 | Resin E | 22.8 | 21.4 | 2.8 | 12% | Yes |
| 6 | Resin F | 25.2 | 23.9 | 2.6 | 10% | Yes |
| 7 | Resin G | 25.7 | 22.1 | 7.2 | 28% | Yes |
| Comparative Example: | | | | | | |
| 1 | Resin H | 12.3 | 12.2 | — | — | No |
| 2 | Resin I | 0.7 | 0.7 | — | — | No |

(1): Total acid value ascribable to acid anhydride groups
(2): Proportion of acid anhydride groups to total acid value of resin
(3): Presence of infrared absorption peak at 1,780 $cm^{-1}$

TABLE 2

| | THF insoluble matter wt. % | Molecular weight distribution of THF-soluble matter: Peak(s) | Content of ≦10,000* component wt. % | Mw | Mn | Mw/Mn | Tg (°C.) Whole | Tg (°C.) ≦10,000* component |
|---|---|---|---|---|---|---|---|---|
| Present Invention: | | | | | | | | |
| Resin A | 29 | 7,200; 46,000 | 25 | 145,000 | 6,100 | 23.8 | 56.2 | 60.6 |
| Resin B | 36 | 9,700; 38,000 | 27 | 97,000 | 6,000 | 16.2 | 55.9 | 59.8 |
| Resin C | 43 | 6,700; 61,000 | 31 | 161,000 | 4,500 | 35.8 | 56.4 | 61.0 |
| Resin D | 17 | 4,900; 23,000 (shoulder) | 28 | 70,000 | 5,100 | 19.6 | 56.1 | 59.6 |
| Resin E | 38 | 6,900; 47,000 | 23 | 162,000 | 5,300 | 30.6 | 55.8 | 61.5 |
| Resin F | 37 | 7,300; 51,000 | 25 | 176,000 | 6,400 | 27.5 | 56.3 | 60.9 |
| Resin G | 35 | 6,100; 39,000 | 24 | 107,000 | 4,200 | 19.6 | 56.4 | 60.4 |
| Comparative Example: | | | | | | | | |
| Resin H | 31 | 24,000 | 3 | 228,000 | 22,000 | 10.4 | 56.0 | — |
| Resin I | 34 | 5,800; 42,000 | 21 | 153,000 | 5,400 | 28.3 | 56.5 | 61.1 |

*Molecular weight

TABLE 3

| | Grindability kg/hr | Fusion inside machine | Blocking resistance (1) | Fixing properties (2) | Offset resistance: Stain, no cleaning member | Offset resistance: Cleaning member provided: Member contam. | Offset resistance: Cleaning member provided: Image stain | Winding-around |
|---|---|---|---|---|---|---|---|---|
| Example: | | | | | | | | |
| 1 | 4.0 | None | 9% | 9% | A (none) | A | A | None |
| 2 | 4.4 | None | 6% | 5% | A (none) | A | A | None |
| 3 | 4.3 | None | 10% | 12% | A (none) | B | B | None |
| 4 | 4.1 | None | 7% | 7% | A (none) | A | A | None |
| 5 | 3.8 | None | 8% | 9% | A (none) | A | A | None |
| 6 | 3.9 | None | 9% | 8% | A (none) | A | A | None |
| 7 | 3.7 | None | 6% | 11% | C (180 sheets) | C | C | None |
| Comparative Example: | | | | | | | | |
| 1 | 2.5 | None | 18% | 27% | A (none) | A | A | None |
| 2 | 3.8 | None | 30% | 31% | C (120 sheets) | F | F | None |

(1): Difference in degree of agglomeration
(2): Rate of lowering of density

TABLE 4

| | Normal temperature, normal humidity: Image density | Fog | 32.5° C., 85% RH: Image density | Fog | 15° C., 10% RH: Image density | Fog | Fusing, filming | Fixing roller contam. |
|---|---|---|---|---|---|---|---|---|
| Example: | | | | | | | | |
| 1 | 1.33-1.37 | A | 1.30-1.33 | A | 1.35-1.40 | A | None | None |
| 2 | 1.35-1.40 | A | 1.31-1.34 | A | 1.36-1.39 | A | None | None |
| 3 | 1.36-1.39 | A | 1.30-1.35 | A | 1.38-1.42 | A | None | None |
| 4 | 1.30-1.33 | A | 1.28-1.31 | A | 1.33-1.37 | B | None | None |
| 5 | 1.31-1.32 | A | 1.27-1.33 | A | 1.30-1.35 | B | None | None |
| 6 | 1.33-1.35 | A | 1.30-1.32 | A | 1.39-1.42 | B | None | None |
| 7 | 1.40-1.42 | A | 1.38-1.40 | A | 1.42-1.45 | B | None | None |
| Comparative Example: | | | | | | | | |
| 1 | 1.31-1.35 | B | 1.09-1.26 | C | 1.36-1.38 | B | None | None |
| 2 | 1.28-1.33 | B | 1.25-1.28 | B | 1.10-1.35 | C | Slightly present | Present |

Evaluation on fog:
A (Excellent), B (Good), C (Passable), F (Failure)

As described above, the present invention relates to a binder resin for toner, which has a specific molecular weight distribution and specific functional groups, and a process for producing the same. Thus, it has excellent effects as follows.

(1) It is a binder resin that can give a toner having superior fixing properties and at the same time superior offset resistance, wind-around resistance and blocking resistance and causing no contamination of a fixing roller, and a process for producing such a binder resin.

(2) It is a binder resin that has a good grindability and can facilitate a good production efficiency of a toner, and a process for producing such a binder resin.

(3) It is a binder resin which is superior in antifusion to the inside of a grinding apparatus when toner materials are pulverized, or anti-fusion to a photosensitive member, and a process for producing such a binder resin.

(4) It is a binder resin that can give a toner having superior developing performance (in particular, image quality), durability, and environmental stability, and a process for producing such a binder resin.

We claim:

1. A binder resin comprising a vinyl copolymer, a mixture of vinyl copolymers, or a mixture of a vinyl copolymer and a vinyl polymer, wherein a resin component comprising a portion of the total molecular weight distribution of the binder resin has a molecular weight of no more than 10,000 and is present in the range of from 5 to 50% by weight based on the whole resin, and said vinyl copolymer, said mixture of vinyl copolymers or said mixture of said vinyl copolymer and said vinyl polymer has an acid anhydride group and a carboxyl group, and wherein an acid value ascribable to the acid anhydride group of said binder resin is not more than 10 mg KOH/g, wherein said acid value is not more than 60% of the total acid value of the binder resin.

2. A binder resin according to claim 1, wherein said vinyl copolymer or said mixture of vinyl copolymers has an acid anhydride group, a carboxyl group and a dicarboxyl group.

3. A binder resin according to claim 1, wherein said vinyl copolymer comprises a styrene copolymer.

4. A binder resin according to claim 2, wherein said vinyl copolymer comprises a styrene copolymer.

5. A binder resin according to claim 1, wherein said component with a molecular weight of not more than 10,000 is contained in an amount of from 10 to 40% by weight based on the whole binder resin.

6. A binder resin according to claim 1, which contains a THF-insoluble matter is an amount of from 5 to 70% by weight based on the whole binder resin.

7. A binder resin according to claim 1, which contains a THF-insoluble matter in an amount of from 10 to 60% by weight based on the whole binder resin.

8. A binder resin according to claim 1, which has a total acid value of from 2 to 100 kg KOH/g, said total acid value being a value measured by hydrolyzing acid anhydride groups.

9. A binder resin according to claim 8, wherein said total acid value of the binder resin is in the range of from 5 to 70 kg KOH/g.

10. A binder resin according to claim 8, wherein said total acid value of the binder resin is in the range of from 5 to 50 mg KOH/g.

11. A binder resin according to claim 1, wherein the acid value ascribable to the acid anhydride group of the binder resin is not more than 8 mg KOH/g.

12. A binder resin according to claim 1, wherein the acid value ascribable to the acid anhydride group of the binder resin is in the range of from 0.1 to 6 mg KOH/g.

13. A binder resin according to claim 1, wherein the acid value ascribable to the acid anhydride group of the binder resin is in the range of from 0.5 to 5.5 mg. KOH/g.

14. A binder resin according to claim 1, wherein the acid value ascribable to the acid anhydride group of the binder resin is not more than 50% of the total acid value of the binder resin.

15. A binder resin according to claim 1, wherein the acid value ascribable to the acid anhydride group of the binder resin is in the range of from 3 to 40% of the total acid value of the binder resin.

16. A binder resin according to claim 1, wherein said vinyl copolymer has an absorption peak at from about 1,750 $cm^{-1}$ to about 1,850 $cm^{-1}$ in the infrared absorption spectrum.

17. A binder resin according to claim 16, wherein said vinyl copolymer has an absorption peak at about 1,780 $cm^{-1}$ in the infrared absorption spectrum.

18. A binder resin according to claim 1, wherein said vinyl copolymer comprises a styrene/acrylate/maleic anhydride/maleic acid copolymer.

19. A binder resin according to claim 1, wherein said mixture of vinyl copolymers comprises a styrene/acrylate/maleic anhydride/maleic acid copolymer and a cross-linked styrene/acrylate/maleic acid half ester copolymer.

20. A binder resin according to claim 1, wherein said vinyl copolymer comprises a styrene/methacrylate/maleic anhydride/maleic acid copolymer.

21. A binder resin according to claim 1, wherein said mixture of vinyl copolymers comprises a styrene/methacrylate/maleic anhydride/maleic acid copolymer and a cross-linked styrene/methacrylate/maleic acid half ester copolymer.

22. A binder resin according to claim 1, which has a weight average molecular weight/number average molecular weight (Mw/Mn) of ≧5 and has at least one peak in the region of a molecular weight of from 2,000 to 100,000, in the molecular weight distribution measured by gel permeation chromatography (GPC) of the THF-soluble matter in said binder resin.

23. A binder resin according to claim 1, which has an Mw/Mn of ≧5, has at least one peak in the region of a molecular weight of from 2,000 to less than 15,000 and has at least one peak or shoulder in the region of a molecular weight of from 15,000 to 100,000, in the molecular weight distribution measured by GPC of the THF-soluble matter in said binder resin.

24. A process for producing a binder resin, comprising the steps of;

forming by solution polymerization a vinyl polymer or vinyl copolymer having a glass transition point (Tg) of ≧50° C.;

forming by heat treatment acid anhydride groups in said polymer or copolymer; and carrying out suspension polymerization by dissolving said polymer or copolymer in a polymerizable monomer or a mixture of polymerizable monomers to hydrolyze part of said acid anhydride groups, thereby obtaining a resin containing a component with a molecular weight of not more than 10,000 in an amount of from 5 to 50% by weight based on the whole resin and having an acid anhydride group and a carboxyl group.

25. A process for producing a binder resin according to claim 24, wherein said vinyl copolymer formed by the solution polymerization comprises an uncross-linked styrene copolymer, and said vinyl copolymer formed by suspension polymerization comprises a cross-linked styrene copolymer.

26. A process for producing a binder resin according to claim 25, wherein said solution polymerization is carried out to form a styrene copolymer by polymerizing in an organic solvent a styrene monomer and a vinyl monomer having a carboxyl group, and said suspension polymerization is carried out to polymerize a monomer composition in which the styrene copolymer formed by the solution polymerization has been dissolved, comprising a styrene monomer, a vinyl monomer having an carboxylic acid ester group, and a cross-linking agent.

27. A process for producing a binder resin according to claim 24, wherein said suspension polymerization is carried out in the presence of from 5 to 100 parts by weight of the vinyl polymer or vinyl copolymer formed by the solution polymerization, based on 100 parts by weight of the monomers used in the suspension polymerization.

28. A process for producing a binder resin according to claim 24, wherein said suspension polymerization is carried out in the presence of from 10 to 80 parts by weight of the vinyl polymer or vinyl copolymer formed by the solution polymerization, based on 100 parts by weight of the monomers used in the suspension polymerization.

29. A process for producing a binder resin according to claim 24, wherein said vinyl copolymer formed by the solution polymerization is formed of a styrene monomer and an unsaturated dibasic acid half ester monomer, and said vinyl copolymer is provided with an acid anhydride group as a result of heat treatment.

30. A process for producing a binder resin according to claim 24, wherein said vinyl copolymer formed by the solution polymerization is formed of a styrene monomer and an unsaturated dibasic acid monomer or unsaturated dibasic acid diester.

31. A process for producing a binder resin according to claim 24, wherein said vinyl copolymer formed by the solution polymerization is formed of a styrene monomer and an unsaturated dibasic acid half ester monomer, and said vinyl copolymer is provided with an acid anhydride group as a result of heat treatment; and a monomer composition containing at least a styrene monomer, an unsaturated dibasic acid half ester monomer and a cross-linking agent is polymerized in said suspension polymerization.

32. A process for producing a binder resin according to claim 24, wherein said solution polymerization is carried out at a temperature of from 70° to 230° C., using monomers in an amount of from 30 to 400 parts by weight based on 100 parts by weight of an organic solvent.

33. A process for producing a binder resin according to claim 24, wherein said solution polymerization is carried out in the presence of not less than 0.05 part by weight of a polymerization initiator, based on 100 parts by weight of monomers.

34. A process for producing a binder resin according to claim 24, wherein said solution polymerization is carried out in the presence of from 0.1 part by weight to 15 parts by weight of a polymerization initiator, based on 100 parts by weight of monomers.

35. A process for producing a binder resin according to claim 24, wherein said suspension polymerization is carried out using a monomer mixture in an amount of not more than 100 parts by weight based on 100 parts by weight of an aqueous medium.

36. A process for producing a binder resin according to claim 24, wherein said suspension polymerization is carried out using a monomer mixture in an amount of from 10 to 90 parts by weight based on 100 parts by weight of an aqueous medium.

37. A process for producing a binder resin according to claim 24, wherein said suspension polymerization is carried out at a temperrture of from 50° to 95° C.

38. A process for producing a binder resin according to claim 32, wherein said organic solvent is removed from the vinyl copolymer by heat treatment after the solution polymerization.

39. A binder resin according to claim 1, wherein said vinyl copolymer, said mixture of vinyl copolymers or said mixture of said vinyl copolymer and said vinyl polymer has a dicarboxyl group.

40. A binder resin according to claim 1, wherein said binder resin contains THF-insoluble matter and THF-soluble matter.

41. A binder resin according to claim 40, wherein said binder resin contains an amount of from 5 to 70% by weight of the THF-insoluble matter.

42. A binder resin according to claim 40, wherein said binder resin contains an amount of from 10 to 60% by weight of the THF-insoluble matter.

43. A binder resin according to claim 1, wherein said binder resin contains THF-insoluble matter and THF-soluble matter, and said vinyl copolymer, said mixture of vinyl copolymers or said mixture of said vinyl copolymer and said vinyl polymer has a dicarboxyl group.

* * * * *

UNITED STATES PATENT AND TRADEMARK OFFICE
CERTIFICATE OF CORRECTION

PATENT NO. : 5,219,946
DATED : June 15, 1993
INVENTOR(S) : HIROHIDE TANIKAWA ET AL.

It is certified that error appears in the above-identified patent and that said Letters Patent is hereby corrected as shown below:

Title page,

AT [30] FOREIGN APPLICATION PRIORITY DATA

Insert, --[30] Foreign Application Priority Data
November 9, 1989 [JP] Japan.....1-291795--.

Title page,

AT [76] INVENTORS

"[76] Inventors:" should read --[75] Inventors:--.

"Hirohide Tanikawa; Masaki Uchiyama; Tsutomu Kukimoto; Yasutaka Akashi; Masaaki Taya; Makoto Unno; Seiichi Takagi, all c/o Canon Kabushiki Kaisha 30-2, 3-chome Shimomaruko, Ohta-ku, Tokyo, Japan"
should read
--Hirohide Tanikawa, Kanagawa-ken; Masaki Uchiyama, Chiba-ken; Tsutomu Kukimoto, Tokyo; Yasutaka Akashi, Kanagawa-ken; Masaaki Taya, Kanagawa-Ken; Makoto Unno, Tokyo; Seiichi Takagi, Kanagawa-ken, all of Japan--.

Title page,

AT [73] ASSIGNEE

Insert, --[73] Assignee: Canon Kabushiki Kaisha,
Tokyo, Japan--.

Title page,

AT [56] REFERENCES CITED

Insert, --Attorney, Agent or Firm—Fitzpatrick, Cella, Harper & Scinto--.

UNITED STATES PATENT AND TRADEMARK OFFICE

CERTIFICATE OF CORRECTION

PATENT NO. : 5,219,946
DATED : June 15, 1993
INVENTOR(S) : HIROHIDE TANIKAWA ET AL.

It is certified that error appears in the above-identified patent and that said Letters Patent is hereby corrected as shown below:

<u>COLUMN 4</u>

Line 65, "of;" should read --of:--.

<u>COLUMN 7</u>

Line 34, "colorim-" should read --calorim- --.
Line 61, "Mn<14,000" should read --Mn>14,000--.

<u>COLUMN 9</u>

Line 45, "impartment" should read --imparting--.
Line 53, "become" should read --becomes--.

<u>COLUMN 10</u>

Line 60, "contribute" should read --contrtibute to--.

<u>COLUMN 11</u>

Line 49, "therefore" should read --therefor--.

<u>COLUMN 13</u>

Line 1, "derivative" should read --derivatives--.

<u>COLUMN 16</u>

Line 28, "carried" should read --carried out--.

UNITED STATES PATENT AND TRADEMARK OFFICE
CERTIFICATE OF CORRECTION

PATENT NO. : 5,219,946
DATED : June 15, 1993
INVENTOR(S) : HIROHIDE TANIKAWA ET AL.

It is certified that error appears in the above-identified patent and that said Letters Patent is hereby corrected as shown below:

COLUMN 18

Line 19, "cooled," should read --being cooled,--.
Line 62, "cooled," should read --being cooled,--.
Line 65, "continued" should read --continues--.

COLUMN 20

Line 25, "resins" should read --resin--.

COLUMN 24

Line 55, "3 part" should read --3 parts--.

COLUMN 28

Line 66, "antifusion" should read --anti-fusion--.

COLUMN 30

Line 41, "of;" should read --of:--.

COLUMN 31

Line 2, "an" should read --a--.

UNITED STATES PATENT AND TRADEMARK OFFICE

CERTIFICATE OF CORRECTION

PATENT NO. : 5,219,946

DATED : June 15, 1993

INVENTOR(S) : HIROHIDE TANIKAWA ET AL.

It is certified that error appears in the above-identified patent and that said Letters Patent is hereby corrected as shown below:

COLUMN 32

Line 23, "temperrture" should read --temperature--.

Signed and Sealed this

Eleventh Day of January, 1994

Attest:

Bruce Lehman

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : 5,219,946

DATED : June 15, 1993

INVENTOR(S) : HIROHIDE TANIKAWA ET AL.

It is certified that error appears in the above-identified patent and that said Letters Patent is hereby corrected as shown below:

TITLE PAGE:

AT [30] FOREIGN APPLICATION PRIORITY DATA

Insert, --[30] Foreign Application Priority Data November 9, 1989 [JP] Japan.....1-291795--.

AT [76] INVENTORS

"[76] Inventors:" should read --[75] Inventors:--.

"Hirohide Tanikawa; Masaki Uchiyama; Tsutomu Kukimoto; Yasutaka Akashi; Masaaki Taya; Makoto Unno; Seiichi Takagi, all c/o Canon Kabushiki Kaisha 30-2, 3-chome Shimomaruko, Ohta-ku, Tokyo, Japan"

should read

Hirohide Tanikawa, Yokohama; Masaki Uchiyama, Ichikawa; Tsutomu Kukimoto, Tokyo; Yasutaka Akashi, Yokohama; Masaaki Taya, Kawasaki; Makoto Unno, Tokyo; Seiichi Takagi, Yokohama; all of Japan.

AT [73] ASSIGNEE

Insert --[73] Assignee: Canon Kabushiki Kaisha, Tokyo, Japan--.

AT [56] REFERENCES CITED

Insert, --Attorney, Agent or Firm—Fitzpatrick, Cella, Harper & Scinto--.

UNITED STATES PATENT AND TRADEMARK OFFICE
CERTIFICATE OF CORRECTION

PATENT NO. : 5,219,946

DATED : June 15, 1993

INVENTOR(S) : HIROHIDE TANIKAWA ET AL.

It is certified that error appears in the above-identified patent and that said Letters Patent is hereby corrected as shown below:

<u>COLUMN 4</u>

Line 65, "of;" should read --of:--.

<u>COLUMN 7</u>

Line 34, "colorim-" should read --calorim- --.
Line 61, "Mn<14,000" should read --Mn>14,000--.

<u>COLUMN 9</u>

Line 45, "impartment" should read --imparting--.
Line 53, "become" should read --becomes--.

<u>COLUMN 10</u>

Line 60, "contribute" should read --contrtibute to--.

<u>COLUMN 11</u>

Line 49, "therefore" should read --therefor--.

<u>COLUMN 13</u>

Line 1, "derivative" should read --derivatives--.

<u>COLUMN 16</u>

Line 28, "carried" should read --carried out--.

UNITED STATES PATENT AND TRADEMARK OFFICE

CERTIFICATE OF CORRECTION

PATENT NO. : 5,219,946

DATED : June 15, 1993

INVENTOR(S) : HIROHIDE TANIKAWA ET AL.

It is certified that error appears in the above-identified patent and that said Letters Patent is hereby corrected as shown below:

COLUMN 18

Line 19, "cooled," should read --being cooled,--.
Line 62, "cooled," should read --being cooled,--.
Line 65, "continued" should read --continues--.

COLUMN 20

Line 25, "resins" should read --resin--.

COLUMN 24

Line 55, "3 part" should read --3 parts--.

COLUMN 28

Line 66, "antifusion" should read --anti-fusion--.

COLUMN 30

Line 41, "of;" should read --of:--.

COLUMN 31

Line 2, "an" should read --a--.

UNITED STATES PATENT AND TRADEMARK OFFICE

CERTIFICATE OF CORRECTION

PATENT NO. : 5,219,946

DATED : June 15, 1993

INVENTOR(S) : HIROHIDE TANIKAWA ET AL.

It is certified that error appears in the above-identified patent and that said Letters Patent is hereby corrected as shown below:

COLUMN 32

Line 23, "temperrture" should read --temperature--.

This certificate supercedes Certificate of Correction issued Jan. 11, 1994.

Signed and Sealed this

Fourteenth Day of April, 1998

Attest:

Bruce Lehman

BRUCE LEHMAN

*Attesting Officer* *Commissioner of Patents and Trademarks*